(12) United States Patent
Uchiyama

(10) Patent No.: US 6,971,368 B2
(45) Date of Patent: Dec. 6, 2005

(54) FUEL INJECTION SYSTEM FOR AN INTERNAL COMBUSTION ENGINE

(75) Inventor: Ken Uchiyama, Toyoake (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/980,813

(22) Filed: Nov. 4, 2004

(65) Prior Publication Data
US 2005/0103312 A1 May 19, 2005

(30) Foreign Application Priority Data
Nov. 17, 2003 (JP) .............................. 2003-386428

(51) Int. Cl.⁷ ............................................. F02D 31/00
(52) U.S. Cl. ................................ 123/359; 123/479
(58) Field of Search ............................. 123/359, 357, 123/479, 198 D, 690, 494, 436; 73/119 A

(56) References Cited

U.S. PATENT DOCUMENTS

| | | | |
|---|---|---|---|
| 5,493,902 A * | 2/1996 | Glidewell et al. | 73/119 A |
| 5,723,780 A * | 3/1998 | Miwa et al. | 73/119 A |
| 6,032,639 A * | 3/2000 | Goto et al. | 123/295 |
| 6,205,977 B1 * | 3/2001 | Hirakata et al. | 123/436 |
| 6,497,223 B1 * | 12/2002 | Tuken et al. | 123/497 |
| 6,694,945 B2 * | 2/2004 | Kawaguchi et al. | 123/299 |
| 6,755,176 B2 * | 6/2004 | Takeuchi et al. | 123/299 |

FOREIGN PATENT DOCUMENTS

JP      A-2001-82230      3/2001

* cited by examiner

Primary Examiner—Carl S. Miller
(74) Attorney, Agent, or Firm—Nixon & Vanderhye P.C.

(57) ABSTRACT

A fuel injection system for an internal combustion engine includes a fuel supply pump, a fuel pressure detector, and a control unit. The fuel supply pump supplies pressurized fuel to a fuel injection valve in the internal combustion engine. The fuel pressure detector detects the pressure of the fuel supplied. The control unit controls the amount of the fuel supplied based on a deviation between an actual fuel pressure and a target fuel pressure. The control unit includes an integral term calculator and an integral term holder. The integral term calculator adds an integral compensation quantity and a last-time integral term to calculate a this-time integral term based on an integral compensation quantity that is updated according to the deviation. The integral term holder stops the updating of the integral compensation quantity and retains the last-time integral term when a defect in the fuel supply pump is detected.

24 Claims, 21 Drawing Sheets

PRESSURE-SUPPLY SHORTAGE

PRESSURE-SUPPLY SURPLUS

FIG. 13A NO AIR

FIG. 13B SMALL QUANTITY OF AIR

FIG. 13C LARGER QUANTITY OF AIR

PRESSURE-SUPPLY DEFECT OR SURPLUS

FUEL INJECTION SYSTEM FOR AN INTERNAL COMBUSTION ENGINE

CROSS REFERENCE TO RELATED APPLICATIONS

This application is based upon and claims the benefit of priority of Japanese Patent Application No. 2003-386428, filed on Nov. 17, 2003, the contents of which are incorporated herein by reference.

FIELD OF THE INVENTION

The present invention relates to a fuel injection system for an internal combustion engine and, more particularly, an accumulator-type fuel injection system for highly accurately detecting defects in pump pressure-supply.

BACKGROUND OF THE INVENTION

A conventional accumulator-type fuel injection system known as a fuel injection system for an internal combustion engine such as a diesel engine is constructed so as to accumulate a high-pressure fuel within a common rail and inject the fuel to cylinders in the internal combustion engine at a predetermined timing from a plurality of fuel injection valves branched from a common rail. It is necessary that fuel of a high-pressure corresponding to a fuel injection pressure be accumulated constantly within the common rail. Therefore, a high-pressure fuel is supplied from a fuel supply pump to the common rail through a fuel pipe. The fuel supplied to the fuel injection valves is pressurized by the fuel supply pump so that the fuel pressure within the common rail is raised to a target fuel pressure corresponding to an operating condition of the internal combustion engine. Such a fuel pressure control for the fuel supply pump is effected by completing the following steps. First, a reference control quantity is calculated for the fuel supply pump based on both a command injection quantity and a target fuel pressure. A feedback correction quantity is then calculated for the reference control quantity based on a deviation between an actual fuel pressure in the common rail and the target fuel pressure. The reference control quantity is then corrected based on the feedback correction quantity. Finally, a fuel discharge quantity in the fuel supply pump is feedback-controlled in such a manner that the actual fuel pressure approaches the target fuel pressure.

The feedback correction quantity is used for compensating a surplus or deficiency (a deviation from the reference control quantity) of the control quantity for the fuel supply pump. The surplus or deficiency occurs depending on a mechanical difference (variations in performance) or a physical change of the fuel supply pump. The feedback correction quantity is calculated from an integral term and a proportional term. The integral term is updated in accordance with a deviation between the actual fuel pressure and the target fuel pressure. The proportional term increases or decreases to eliminate the deviation between the actual fuel pressure and the target fuel pressure. The integral term (this-time integral term) for calculating the feedback correction quantity is obtained by adding an integral compensation quantity and the last-time integral term. The integral compensation quantity is updated in accordance with the deviation between the actual fuel pressure and the target fuel pressure.

Furthermore, JP 2001-82230A (pp. 1–10, FIGS. 1–20) discloses an accumulator type fuel injection system including a suction-metering-type fuel supply pump. The suction-metering-type fuel supply pump is adapted to pressurize fuel introduced into a pressure chamber through a suction metering valve and supply the pressurized fuel into a common rail. The system also includes a fuel pressure sensor for detecting the pressure of the fuel supplied into the common rail. The amount of the fuel to be discharged into the common rail is determined based on the fuel pressure in the common rail and a mechanical difference in the fuel supply pump, e.g., variations in metering characteristics of a suction-metering valve caused by a pump machine difference. The fuel pressure and the mechanical difference are learned and corrected to diminish variations in the fuel discharge quantity (actual suction quantity) relative to a control command value (command suction quantity). This is to improve the controllability of the fuel pressure in the common rail.

However, in the conventional accumulator-type fuel injection system, the feedback correction quantity tends to become too large for replenishing the pump pressure-supply quantity which becomes short in the normal control (normal) mode corresponding to the normal function of the fuel supply pump. This is especially true for the integral compensation quantity, which is updated in accordance with a deviation between the actual fuel pressure and the target fuel pressure. Hence, the integral compensation quantity causes the fuel pressure in the common rail or in the fuel pipe to rise to a greater extent than necessary when an operation is performed for a sudden rise in the common rail pressure due to a sudden acceleration. This is because the integral compensation quantity was learned to be greater than the normal control (normal) corresponding to the normal function of the fuel supply pump.

As a result, when the actual fuel pressure rises to a higher extent than necessary in comparison with the target fuel pressure, an overshoot of the fuel pressure occurs. This means that the fuel pressure exceeds an upper-limit value, which the accumulator-type fuel injection system permits and an abnormal high-pressure condition of the high-pressure fuel portion in the accumulator-type fuel injection system is continued until a re-learning of the integral compensation quantity is established. As a result, deterioration of a pressure-resistant structure of the fuel pipeline is accelerated. This causes a factor of deterioration in the reliability of products such as leakage of the fuel from the fuel supply pump or from the fuel injection valve to the exterior. Moreover, the overshoot of the fuel pressure caused by an excessive integral compensation quantity may exceed a valve opening pressure of a pressure limiter installed in the common rail and open the valve of the pressure limiter for avoiding the abnormal high-pressure condition of the high-pressure fuel portion in the accumulator type fuel injection system. With the pressure limiter opened, a lowering of the common rail pressure obstructs a satisfactory fuel injection and causes a lowering in output of the internal combustion engine or deterioration (lowering) of the valve opening pressure in the pressure limiter.

In the accumulator-type fuel injection system described in JP 2001-82230A, the learning control for a mechanical individual difference of the fuel supply pump, for example, a pump machine difference in metering characteristics of the suction metering valve, is performed on the premise that the fuel pressure control for discharging the high-pressure fuel having been pressurized to a high-pressure level in the pressure chamber of the fuel supply pump into the common rail is effected without any trouble of the fuel supply pump. Therefore, when the learning of the pump machine difference is continued in the event of occurrence of a pressure-supply defect failure of the fuel supply pump, an erroneous learning value (or learning quantity) is acquired and it is likely that the subsequent controllability for the fuel pressure in the common rail may be rather deteriorated.

SUMMARY OF THE INVENTION

It is an object of the present invention to provide a fuel injection system for an internal combustion engine which can prevent the occurrence of a rise in fuel pressure greater than necessary caused by an excessive learning of the integral compensation quantity upon detection of a pressure-supply defect of a fuel supply pump and can thereby prevent deterioration of controllability for the pressure of fuel supplied from the fuel supply pump to a fuel injection valve. It is another object of the present invention to provide a fuel injection system for an internal combustion engine which can prevent the occurrence of an erroneous learning of a mechanical individual difference or a physical change of a fuel supply pump upon detection of a pressure-supply defect of the fuel supply pump and can thereby prevent deterioration of the controllability for the pressure of the fuel supplied from the fuel supply pump to a fuel injection valve.

Therefore, according to one aspect of the present invention, updating of an integral compensation quantity is stopped and a last-time integral term is held and continued when a pressure-supply defect of a fuel supply pump is detected. With this arrangement, a greater rise than necessary of the pressure of fuel supplied under pressure from the fuel supply pump to a fuel injection valve, which is caused by an excessive learning of the integral compensation quantity in the event of occurrence of a pressure-supply defect of the fuel supply pump, e.g., the occurrence of overshoot of the fuel pressure in which an actual fuel pressure in a common rail or in a fuel pipe becomes higher than a target fuel pressure, can be prevented. Consequently, it becomes possible to prevent deterioration of the controllability for the pressure of fuel supplied under pressure from the fuel supply pump to the fuel injection valve. Moreover, since it is possible to prevent deterioration of a pressure-resistant structure of a fuel pipe line in the fuel injection system for an internal combustion engine, it is possible to prevent leakage of the fuel from the fuel supply pump or the fuel injection valve to the exterior and hence possible to improve the reliability of each product.

In another aspect of the present invention, feedback-controlling the fuel pressure supply quantity of the fuel supply pump based on a deviation between the actual fuel pressure and the target fuel pressure includes feedback-controlling the fuel discharge quantity or fuel suction quantity of the fuel supply pump or a control command value to the fuel supply pump (e.g., a drive current value to a discharge quantity control valve such as a suction metering valve which can change the fuel pressure-supply quantity or the fuel discharge quantity in the fuel supply pump) based on a deviation between the actual fuel pressure and the target fuel pressure.

According to another aspect of the present invention, a feedback correction quantity is calculated based on a this-time integral term which is updated in accordance with a deviation between an actual fuel pressure detected by a fuel pressure detector and a target fuel pressure set by a fuel pressure determiner and a this-time proportional term which is calculated in accordance with the said deviation. Then, the fuel pressure supply quantity of the fuel supply pump is feedback-controlled based on the feedback correction quantity.

According to another aspect of the present invention, when a pressure-supply defect of a fuel supply pump is detected, an integral compensation quantity and a last-time integral term are eliminated and a this-time integral term is calculated, that is, this-time integral term is cleared. With this arrangement, a greater rise than necessary of the pressure of fuel supplied from the fuel supply pump to a fuel injection valve, which is caused by an excessive learning of the integral compensation quantity in the event of a pressure-supply defect of the fuel supply pump, for example the occurrence of a fuel pressure overshoot in which an actual fuel pressure within a common rail or within a fuel pipe becomes higher than a target fuel pressure, can be prevented.

According to another aspect of the present invention, feedback-controlling the fuel pressure supply quantity of the fuel supply pump based on a deviation between an actual fuel pressure and a target fuel pressure includes feedback-controlling the fuel discharge quantity or fuel suction quantity of the fuel supply pump, or the fuel discharge pressure of the fuel supply pump, or a control command value to the fuel supply pump (e.g., a drive current value to a discharge quantity control valve such as a suction metering value which can change the fuel pressure-supply quantity or fuel discharge quantity in the fuel supply pump in accordance with a drive current value) based on a deviation between the actual fuel pressure and the target fuel pressure.

According to another aspect of the present invention, a reference control quantity for a fuel supply pump is calculated based on a target injection quantity set by an injection quantity determiner and a target fuel pressure set by a fuel pressure determiner, then an integral compensation quantity which is updated in accordance with a deviation between an actual fuel pressure and the target fuel pressure, as well as a last-time integral term, are added to calculate a this-time integral value, and a feedback correction quantity relative to the reference control quantity for the fuel supply pump is calculated based on the this-time integral term thus calculated. Then, the reference control quantity is corrected using the feedback correction quantity to feedback-control the fuel pressure supply quantity in the fuel supply pump. As a result, a surplus or shortage (deviation from the reference control quantity) of the control quantity for the fuel supply pump, which results from a mechanical individual difference (variations in performance) or a physical change of the fuel supply pump, can be compensated.

According to another aspect of the present invention, when a pressure-supply defect of a fuel supply pump is detected, a learning control for learning a mechanical individual difference or a physical change of the fuel supply pump is stopped or inhibited, whereby it becomes possible to prevent an erroneous learning of a mechanical individual difference or a physical change of the fuel supply pump. Consequently, in the event of a pressure-supply defect of the fuel supply pump and when the learning of a mechanical individual difference or a physical change of the fuel supply pump is continued, it is possible to prevent the acquisition of an erroneous learning value and hence possible to prevent deterioration of the controllability for the pressure of the fuel supplied under pressure from the fuel supply pump to a fuel injection valve. According to the invention defined in claim 6, there is made a learning control for learning variations in an actual pump suction quantity or pump discharge quantity relative to a pump command suction quantity or pump command discharge quantity which variations are caused by a mechanical individual difference or a physical change of the fuel supply pump. With this arrangement, it becomes possible to improve the controllability for the fuel pressure at the time of converging an actual fuel pressure to a target fuel pressure.

According to another aspect of the present invention, the time when a pressure-supply defect of the fuel supply pump is detected indicates any of the period in which a failure or a control defect of the fuel supply pump is detected, the period until the lapse of a predetermined time after a failure or a control defect of the fuel supply pump is no longer detected from the time when the failure or the control defect has been detected, and the period until the operation of the internal combustion engine is stopped from the time when a failure or a control defect of the fuel supply pump has been detected. Consequently, a greater rise than necessary of the pressure of the fuel supplied under pressure from the fuel supply pump to a fuel injection valve which rise is caused by an excessive learning of an integral compensation quantity in the event of a pressure-supply defect of the pump or an erroneous learning of a mechanical individual defect or a physical change of the fuel supply pup, for example a fuel pressure overshoot in which an actual fuel pressure in a common rail or a fuel pipe becomes higher than a target fuel pressure, can be surely prevented.

According to yet another aspect of the present invention, as the fuel supply pump there may be used a high-pressure supply pump having a plurality of pressure-supply systems, the pressure-supply systems being connected respectively to the plurality of fuel injection valves to supply a high-pressure fuel toward the interior of a fuel pipe, the fuel injection valves being mounted correspondingly to cylinders of the internal combustion engine through the fuel pipe. A common rail for temporary storage of the high-pressure fuel discharged from the plurality of pressure-supply systems in the high-pressure supply pump may be installed at a certain position of the fuel pipe which connects the plurality of pressure-supply systems and the plurality of fuel injection systems with each other. That is, as the fuel injection system for an internal combustion engine there may be adopted an accumulator type fuel injection system in which a high-pressure fuel is accumulated within a common rail and is injected into each cylinder of the internal combustion engine at a predetermined timing through the associated fuel injection valve. For example, a fuel pressure-supply quantity in at least one of the pressure-supply systems of the high-pressure supply pump may be feedback-controlled based on a deviation between an actual fuel pressure as the fuel pressure within the common rail and a target fuel pressure which is set in accordance with an operating condition of the internal combustion engine. With this, the controllability for the fuel pressure at the time of converting the actual fuel pressure to the target fuel pressure can be improved.

According to yet another aspect of the present invention, a pump pressure-supply quantity for each of the plurality of pressure-supply systems in the fuel supply pump is estimated and is then compared with a first decision value and a second decision value which is smaller than the first decision value. Then, in the case where the pump pressure-supply quantity is larger or smaller than the first decision value in only at least one of the plurality of pressure-supply systems, i.e., in only a specific pressure-supply system, it is determined that a pump failure such as a pump pressure-supply surplus failure or a pump pressure-supply shortage failure is occurring in the pressure-supply system concerned. Thus, without performing any special operation for detecting a failure, the occurrence of a pump failure such as a pump pressure-supply surplus failure or a pump pressure-supply shortage failure of the plurality of pressure-supply systems in the high-pressure fuel supply pump can be detected and hence it is possible to prevent a lowering of the fuel pressure within a common rail or within a fuel pipe. Accordingly, it becomes possible to prevent the fuel injection into the internal combustion engine from becoming unstable or prevent engine stall during inspection of the fuel supply pump for the occurrence of a failure such as a pressure-supply surplus failure or a pump pressure-supply shortage failure.

The pressure-supply systems in the high-pressure supply pump indicate a plurality of fuel suction paths extending from a known feed pump for pumping a low pressure fuel from a fuel tank up to a plurality of pressure chambers which pressurize the fuel with use of the plurality of plungers, suction check valves installed in the fuel suction paths, electromagnetic valves such as suction metering valves installed in one or more of the plurality of fuel suction paths, plurality of fuel pressure supply paths extending from the plurality of pressure chambers up to a plurality of discharge ports, and a plurality of discharge valves or a plurality of high-pressure check valves installed in those fuel pressure-supply paths. Therefore, in the case of a high-pressure supply pump provided with an electromagnetic valve for each of pressure-supply systems, pump pressure-supply shortage or pump pressure-supply surplus caused by sticking of an electromagnetic valve can be detected for each pressure-supply system.

When the pressure-supply quantity of the pump is larger or smaller than the second decision value in only at least one of the plurality of pressure-supply systems, that is, in only a specific pressure-supply system, it is determined that there exists a pump control defect such as pressure-supply shortage caused for example by the incorporation of air into the cylinder of the pressure-supply system concerned prior to a complete shortage of fuel or pressure-supply surplus. Thus, by setting the second decision value smaller than the first decision value for detecting a pump failure, a pump control defect such as pressure-supply shortage caused for example by the incorporation of air into the cylinder of the pressure-supply According to another exemplary aspect of the present invention, when the pressure-supply quantity of the pump is smaller than the first or second decision values in all of the pressure-supply systems, this state is regarded for example as a complete shortage of fuel in which the amount of fuel remaining within the fuel tank is not larger than a predetermined value and is excluded (from the determination of a pump failure such as a pump pressure-supply surplus failure or a pump pressure-supply shortage failure and the determination of a pump control defect caused by the incorporation of air into the cylinder of the pressure-supply system concerned prior to a complete shortage of fuel or a pump control defect such as a slide defect of a slide portion or an operation defect of a movable portion in the pressure-supply system concerned). When the pressure-supply quantity of the pump is larger than the first decision value in all of the pressure-supply systems, it is determined that pump pressure-supply surplus is occurring in all of the pressure-supply systems, whereby it becomes possible to make a positive distinction between a pump pressure-supply shortage failure and a pump pressure-supply defect caused by a complete shortage of fuel.

According to yet another aspect of the present invention, a pressure-supply quantity of a high-pressure supply pump is estimated for each of the plurality of pressure-supply systems and a difference between a last-time pressure-supply quantity and a this-time pressure-supply quantity for each of the pressure-supply systems is calculated and compared with a first decision value and a second decision value smaller than the first decision value. When the difference between the last-time pressure-supply quantity and the this-time pressure-supply quantity for each of all the pressure-supply systems is larger or smaller than the first decision value, it is determined that a pump failure such as pump pressure-supply surplus failure or pump pressure-supply shortage failure is occurring in the pressure-supply system concerned. Thus, the occurrence of a pump failure such as pump pressure-supply surplus failure or pump pressure-supply shortage failure for each of the plurality of pressure-supply systems in the high-pressure supply pump can be detected without performing any special operation for detecting a failure, whereby it is possible to prevent a lowering of pressure within a common rail or within a fuel pipe. Consequently, it becomes possible to prevent the injection of fuel into an internal combustion engine from becoming unstable or prevent engine stall during inspection for a pump failure such as pump pressure-supply surplus failure or pump pressure-supply shortage failure.

In the case of a high-pressure supply pump which uses a single electromagnetic valve for metering the amount of fuel to be introduced into the plurality pressure-supply systems, a pump excessive pressure-supply occurs due to sticking of the electromagnetic valve and it occurs not in a specific pressure-supply cylinder but in all of pressure-supply systems simultaneously, and therefore it is impossible to specify a failed pressure-supply system. However, as to a pump pressure-supply defect failure, it is possible to specify a failed pressure-supply system because one suction check valve and one high-pressure check valve are provided for each pressure-supply system.

Furthermore, when the difference between the last-time pressure-supply quantity and the this-time pressure-supply quantity for each of all the pressure-supply systems is larger or smaller than the second decision value, it is determined that there occurs a pump control defect such as pressure-supply shortage or pressure-supply surplus caused for example by the incorporation of air into the cylinder of the pressure-supply system concerned before a complete shortage of fuel. Thus, by providing the second decision value smaller than the first decision value for detecting a pump failure, a pump control defect caused by the incorporation of air into the cylinder of the pressure-supply system concerned before a complete shortage of fuel or a pump control defect such as a slide defect of a slide portion or an operation defect of a movable portion in the pressure-supply system concerned can be detected with a high accuracy.

According to yet another aspect of the present invention, the first or the second decision value is set based on a fuel pressure-supply quantity or a fuel discharge quantity or a fuel discharge pressure for each pressure-supply system in case of all the pressure-supply systems in the high-pressure supply pump being normal. In this case, a fuel pressure-supply quantity for each pressure-supply system in case of all the pressure-supply systems in the high-pressure supply pump being normal may be calculated based on a drive current value to an electromagnetic valve such as a suction metering valve for example and an engine speed. The first or the second decision value may be set based on at least one of an engine speed, a fuel injection quantity, and a fuel injection pressure. The fuel injection quantity may be substituted by a basic injection quantity (a target injection quantity: Q) which is set in accordance with an operating condition of the internal combustion engine or a command injection quantity (QFIN) which is calculated by adding an injection correction quantity to the target injection quantity (Q). Likewise, the fuel injection pressure may be substituted by a fuel pressure (NPC) within the fuel pipe or within the common rail detected by the fuel pressure detector or a target fuel pressure (PFIN) which is set in accordance with an operating condition of the internal combustion engine.

Accordingly, one mode for carrying out the present invention, the object of preventing, at the time of detecting a pressure-supply defect of a fuel supply pump, a greater rise than necessary of a fuel pressure caused by an excessive learning of an integral compensation quantity which is updated in accordance with a deviation between an actual fuel pressure and a target fuel pressure, is achieved by stopping the updating of the integral compensation quantity or by eliminating the integral compensation quantity to hold and continue a last-time integral term. Further, the object of preventing the occurrence of an erroneous learning of a mechanical individual difference or a physical change of a fuel supply pump at the time of detecting a pressure-supply defect of the pump is achieved stopping or inhibiting a learning control for learning variations in fuel pressure-supply quantity relative to a control command value for the fuel supply pump.

Other features and advantages of the present invention will be appreciated, as well as methods of operation and the function of the related parts from a study of the following detailed description, appended claims, and drawings, all of which form a part of this application. In the drawings:

BRIEF DESCRIPTION OF THE DRAWINGS

FIG. 13A is a graphical diagram of a change in a pump discharge quantity in two pressure-supply systems prior to incorporating air;

FIG. 13B is a graphical diagram of a change in the pump discharge quantity in the two pressure-supply systems of FIG. 13B incorporating a small amount of air;

FIG. 13C is a graphical diagram of a change in the pump discharge quantity in the two pressure-supply systems of FIGS. 13A and 13B incorporating a large amount of air;

DETAILED DESCRIPTION OF THE PREFERRED EMBODIMENTS

Figure 1:
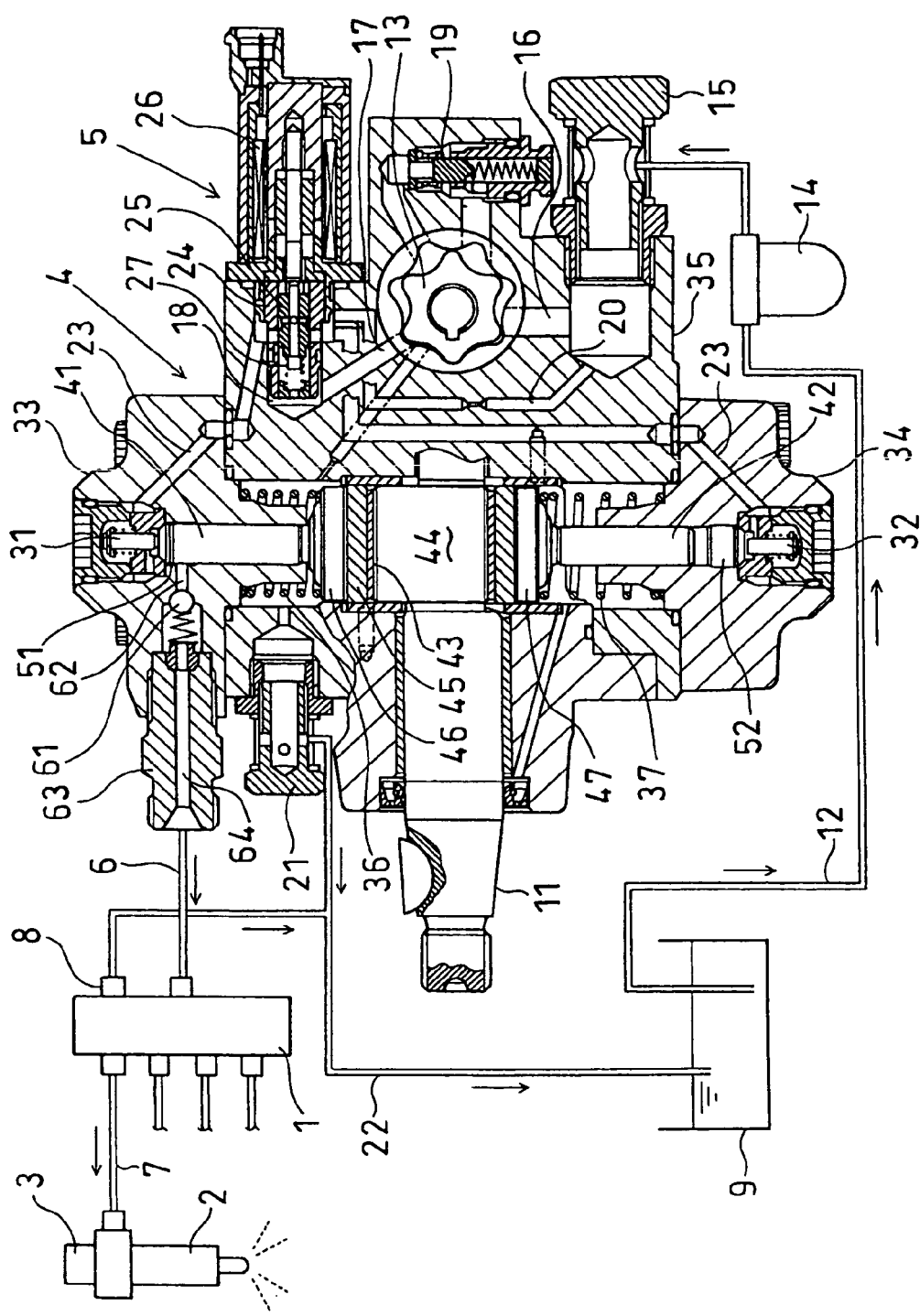
FIG. 1 is a cross-sectional view of a supply pump in accordance with a first embodiment of the present invention.
Figure 2:
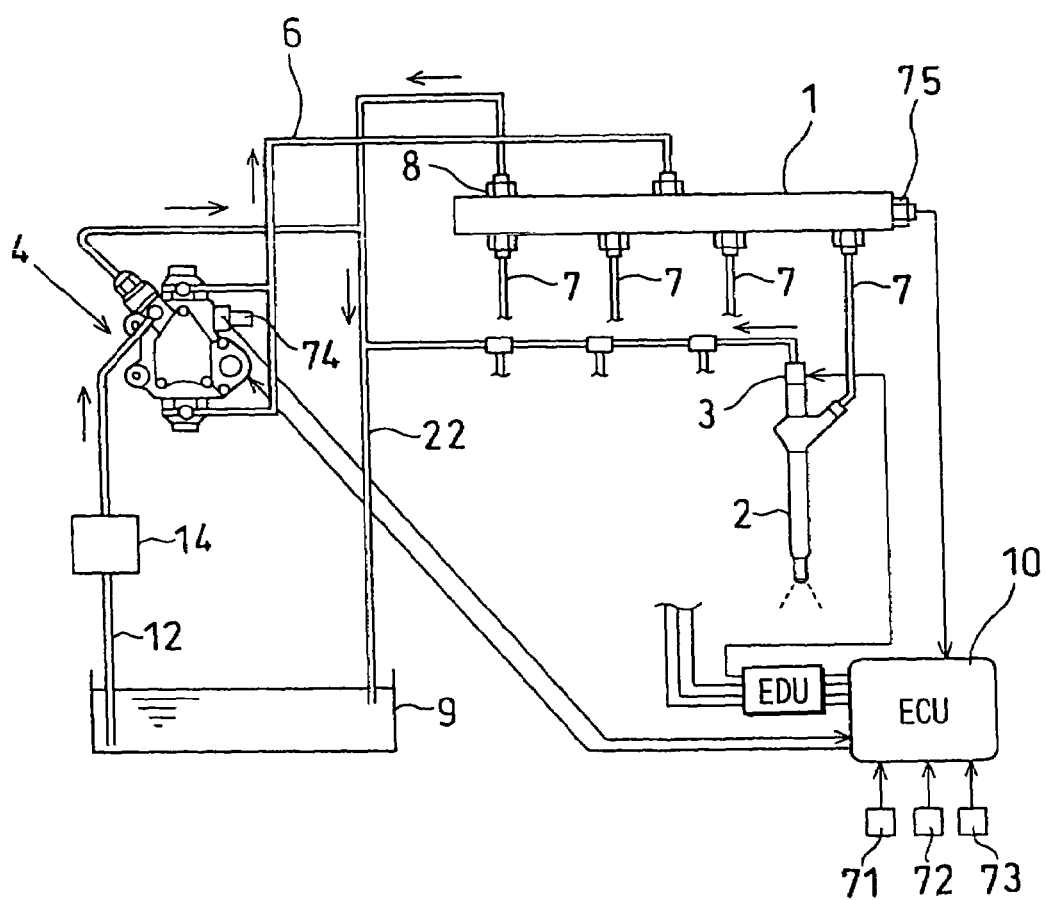
FIG. 2 is a schematic diagram a common rail type fuel injection system in accordance with the first embodiment of the present invention.
Figure 3:
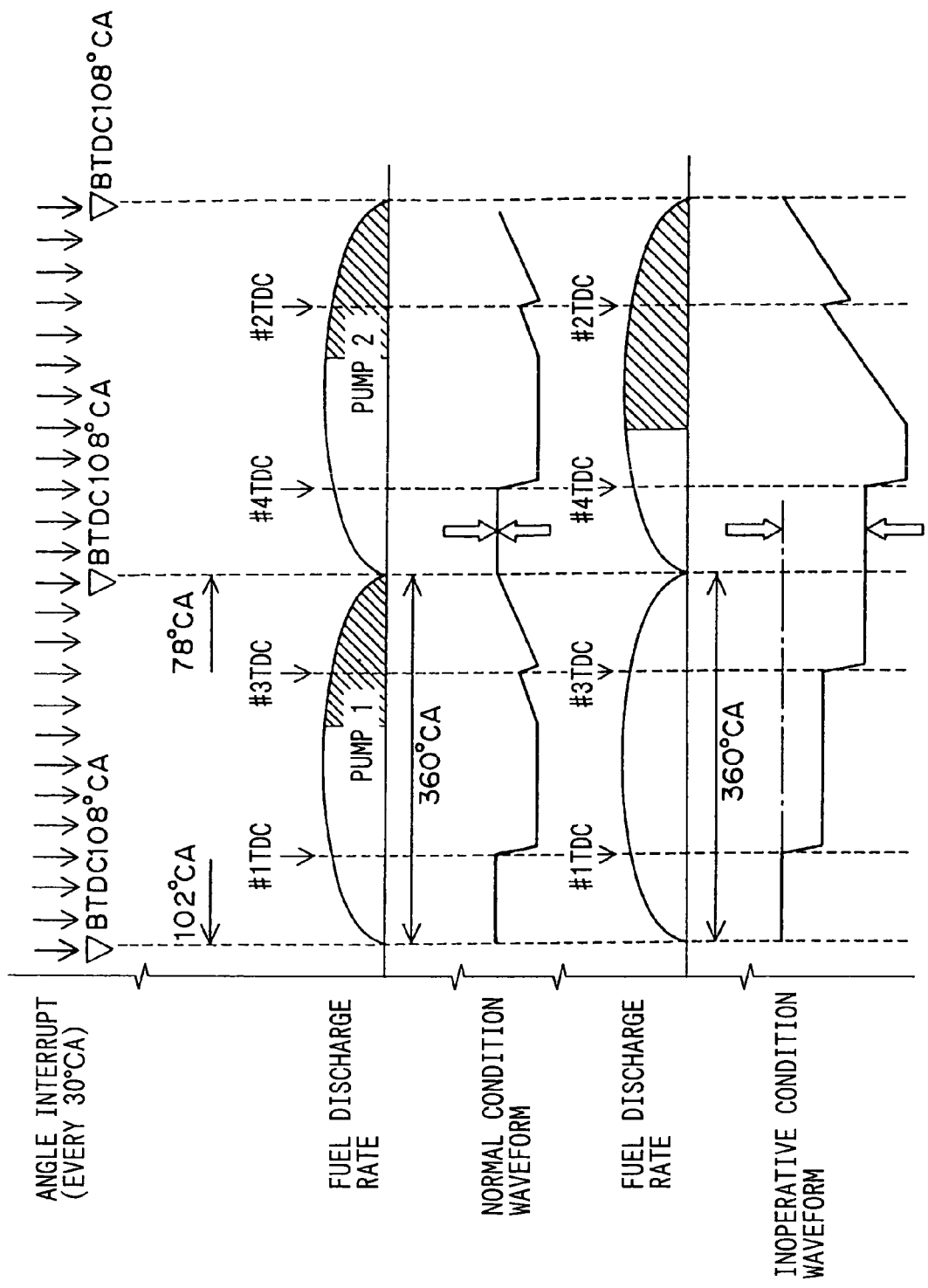
FIG. 3 is a timing chart showing crank angle, fuel discharge rate, pressure waveform in a normal condition, fuel discharge rate, and waveform in an inoperative condition of a pressure-supply system in accordance with the first embodiment of the present invention.

FIGS. 1 to 13 illustrate a first embodiment of the present invention. FIG. 1 shows an entire construction of a supply pump. FIG. 2 shows an entire construction of a common rail type fuel injection system. FIG. 3 is a timing chart showing crank angle, fuel discharge rate, pressure waveform in normal condition, fuel discharge rate, and pressure waveform in inoperative condition of one pressure-supply system.

A fuel injection system for an internal combustion engine according to the first embodiment is a common rail type fuel injection system (an accumulator type fuel injection system) which is known as a fuel injection system for an internal combustion engine (hereinafter referred to simply as "engine") such as a multi-cylinder diesel engine mounted on a vehicle, e.g., automobile. It is constructed so that a high-pressure fuel stored within a common rail 1 is injected into combustion chambers of cylinders in the engine through a plurality of injectors (electromagnetic type fuel injection valves) 2 which are mounted correspondingly to the cylinders of the engine.

The common rail type fuel injection system is provided with the common rail 1, the plurality of injectors 2, a suction fuel metering metering type supply pump 4, and an engine control unit (hereinafter referred to as an ECU) 10. The common rail 1 accumulates a high-pressure fuel. The plurality of injectors 2 injects the fuel into the cylinders of the engine. The suction fuel metering type supply pump (fuel supply pump) 4 pressurizes the fuel to a high-pressure level, which fuel is then introduced into a plurality of plunger chambers (pressure chambers) through a suction metering valve (SCV) 5. The ECU 10 electronically controls electromagnetic valves 3 of the plurality of injectors 2 and the suction metering valve 5 of the supply pump 4. In FIGS. 1 and 2, only one injector 2 corresponding to one cylinder of the engine, which is a four-cylinder engine, is presented. Illustration of injectors is omitted with respect to the other cylinders for simplicity.

The common rail 1 is connected between a high-pressure fuel pipe 6 and a plurality of high-pressure fuel pipes (branch pipes) 7 for supplying a high-pressure fuel from the supply pump 4 to the injectors 2. Since it is necessary to constantly accumulate high-pressure fuel corresponding to a fuel injection pressure in the common rail 1, a high-pressure fuel is supplied from the supply pump 4 to the common rail 1 through the high-pressure fuel pipe 6. A pressure limiter 8 is installed in the common rail 1. The pressure limiter 8 is adapted to open when the common rail pressure exceeds a preset limit pressure to keep the common rail pressure below the preset limit pressure. The injection of fuel from the injectors 2 into the combustion chambers of the engine cylinders is electronically controlled via an electric current supplied to the electromagnetic valves 3. The electromagnetic valves 3 each control the fuel pressure in a backpressure control chamber. The backpressure control chambers control the operation of a command piston interlocked with a nozzle pin. That is, while the electromagnetic valves 3 are energized to open the nozzle needles, the high-pressure fuel accumulated in the common rail 1 is injected into the combustion chambers of the cylinders, thereby operating the engine. Leaking fuel overflows from the injectors 2, the supply pump 4, and the pressure limiter 8 to the lower pressure side of the fuel system and returns to a fuel tank 9 through a return pipe 22.

The supply pump 4 used in this embodiment is a high-pressure supply pump provided with two pressure-supply systems for pressurizing sucked fuel and supplying the fuel to the common rail 1 and high-pressure fuel pipe 6. This high-pressure supply pump uses a single suction metering valve 5. The suction metering valve 5 meters the amount of sucked fuel to control a fuel pressure-supply quantity (pump pressure-supply quantity) or a fuel discharge quantity (pump discharge quantity) in all of the pressure-supply systems. The supply pump 4 includes a pump drive shaft (cam shaft) 11 that is rotationally driven by the engine. A drive pulley (not shown) is mounted on an outer periphery of a front end portion (left end in the drawing) of the cam shaft 11. The drive pulley is drivingly connected to a crank pulley on a crank shaft of the engine through a belt. The supply pump 4 incorporates an inner cam-type feed pump (low pressure feed pump) 13 which pumps up a low pressure fuel from the fuel tank 9 through a fuel supply pipe 12 as the cam shaft 11 rotates with the crank shaft. In FIG. 1, the feed pump 13 is shown in a 90° developed form. A fuel filter 14 is installed at a certain position of the fuel supply pipe 12 for filtering or capturing impurities contained in the fuel, which is sucked from the fuel tank 9 into the feed pump 13.

As the cam shaft 11 rotates and the feed pump 13 is actuated, fuel is introduced from the fuel tank 9 into a fuel inlet path 16 through the fuel filter 14 and an inlet (fuel inlet) 15 and is sucked into the suction side of the feed pump 13. The inlet 15 comprises a sleeve nipple and a screw. The feed pump 13 pressurizes the sucked fuel to a predetermined pressure and feeds it to a fuel sump 18 in the suction metering valve 5 via a fuel outlet path 17. In the vicinity of the feed pump 13 used in this embodiment a pressure regulating valve (regulator valve) 19 is provided. The pressure regulating valve 19 is for preventing a discharge pressure from exceeding a predetermined fuel pressure. The discharge pressure is discharged from the feed pump 13 into the fuel sump 18 in the suction metering valve 5. Surplus fuel overflowing from the suction metering valve 5 is returned to the suction side of the feed pump 13 through a fuel recycle path 20 and the fuel inlet path 16. A portion of the fuel discharged from the feed pump 13 lubricates slide portions such as first and second pump elements, which will be described later, and is thereafter returned to the fuel tank 9 through an outlet (fuel outlet) 21 and further through a return pipe 22. The outlet 21 comprises a sleeve nipple and a screw.

The fuel in the fuel sump 18 is sucked into first and second plunger chambers (pressure chambers) 51, 52 through the suction metering valve 5 and further through first and second suction valves 31, 32. The first and second suction valves 31 and 32 are each provided with a valve element and a coiled spring. The first and second suction valves 31 and 32 function as check valves for preventing reverse flow of fuel from the first and second plunger chambers 51, 52 toward the suction metering valve 5. The first and second suction valves 31, 32 are held within first and second cylinder heads 33, 34, respectively. In a normal condition, the valve elements of the first and second suction valves 31, 32 are urged vertically, relative to the figure, by a biasing force of the coiled springs and sit closed on seat surfaces. When a low pressure fuel flows from the suction metering valve 5 into the first and second suction valves 31, 32, the valve elements open under the fuel pressure and fuel is sucked into the first and second plunger chambers 51, 52. When pressurization is started, the valve elements of the first and second suction valves 31, 32 are closed by the fuel pressure in the first and second plunger chambers 51, 52. This state is held until the end of pressure-supply of the fuel.

The suction metering valve 5 is installed intermediate between the first and second fuel suction paths 23 in the area from the fuel sump 18 to the first and second suction valves 31, 32. The suction metering valve 5 is a normally open (or normally closed) type electromagnetic flow control valve. The suction metering valve 5 includes a valve (valve element) 25, a valve drive 26, and a valve biasing device 27. The valve 25 is held slidably within a sleeve-like housing 24. The valve drive means (solenoid coil) 26 actuates the valve 25 in a closing direction of the valve. The valve biasing device (coiled spring) 27 biases the valve 25 in an opening direction of the valve. A drive control value for the solenoid coil 26 in the suction metering valve 5 is controlled by the ECU 10 to adjust a lift quantity of the valve 25. The lift quantity being defined as an opening area of the flow path communicating with the first and second fuel suction paths 23. This enabled the amount of fuel being introduced into the first and second plunger chambers 51, 52 to be controlled. When the solenoid coil 26 is de-energized, the valve 25 opens (or closes) with the biasing force of the coiled spring 27. When the solenoid coil 26 is energized, the valve 25 closes (or opens) against the biasing force of the coiled spring 27.

In the supply pump 4 used in this embodiment, first and second cylinder heads (cylinders) 33, 34 are fixed to upper and lower ends of a pump housing 35, respectively. First and second plungers 41, 42 are slidingly received within slide bores of the first and second cylinder heads 33, 34, respectively. On an upper end of the drawing of the first plunger 41 there is provided a first plunger chamber 51. The first plunger chamber 51 is formed by a lower end face in the drawing of the first suction valve 31 and an inner wall surface of the first cylinder head 33. On a lower end of the drawing of the second plunger 42 there is provided a second plunger chamber 52. The second plunger chamber 52 is formed by an upper end face in the drawing of the second suction valve 32 and an inner wall surface of the second cylinder head 34. Therefore, the first and second plunger chambers 51, 52 are constructed so that a low pressure fuel flows from an outlet portion of the suction metering valve 5 into the plunger chambers through the first and second fuel suction paths 23 and the first and second suction valves 31, 32. In this embodiment, a pressure-supply system #1 (a first pump element, a first high-pressure supply pump) in the supply pump 4 is comprised of the first plunger 41 and the first cylinder head 33. A pressure-supply system #2 (a second pump element, a second high-pressure supply pump) in the supply pump 4 is comprised of the second plunger 42 and the second cylinder head 34.

A cam shaft 11, adapted to be synchronously rotated with the crank shaft of the engine, is inserted into the pump housing 35. The pump housing 35 is formed of a metallic material. The cam shaft 11 is supported rotatably through a journal bearing. An eccentric cam 44 is integrally formed on an outer periphery of an intermediate portion of the cam shaft 11. The first and second plungers 41, 42 are disposed at symmetric positions with respect to the eccentric cam 44 in the vertical direction in the drawing. The eccentric cam 44 is eccentrically positioned relative to the axis of the cam shaft 11 and has a circular section. A cam ring 45 having a generally square profile is slidably held on the outer periphery of the eccentric cam 44 through an annular bushing 43. A hollow portion having a circular section is formed in the interior of the cam ring 45. The bushing 43 and the eccentric cam 44 are accommodated in the hollow portion.

First and second plate members 46, 47 integral with the first and second plungers 41, 42 are urged against upper and lower end faces, respectively, of the cam ring 45 with the biasing forces of first and second coiled springs 36, 37. According to this construction, when the eccentric cam 44 integral with the cam shaft 11 rotates, the cam ring 45 revolves along a predetermined circular path and the first and second plate members 46, 47 slide and reciprocate on upper and lower end faces in the drawing of the cam ring 45. As a result, the first and second plungers 41, 42 slide and reciprocate vertically in the drawing on slide surfaces within the first and second cylinder heads 33, 34. This makes it possible to highly pressurize the fuel in the first and second plunger chambers 51, 52.

The pressurized fuel in the first plunger chamber 51 is discharged from a first discharge valve 61 through a first fuel pressure-supply path (first discharge hole) 62. Likewise, the pressurized fuel in the second plunger chamber 52 is discharged from a second discharge valve (not shown) through a second fuel pressure-supply path (second discharge hole) (not shown). The first discharge valve 61 and the second discharge valve function as check valves for preventing reverse-flow of the fuel from the first discharge hole 62 and the second discharge hole (not shown) toward the first and second plunger chambers 51, 52. The first and second discharge valves are each provided with a valve element (ball valve) and a coiled spring. The valve element is for opening and closing the first discharge hole 62 (or the second discharge hole). The coiled spring is for urging the ball valve into its closed position. High-pressure fuel portions discharged from the first discharge hole 62 and the second discharge hole flow through a first fuel pressure-supply path 64 and a second fuel pressure-supply path (not shown). The first fuel pressure-supply path 64 is formed within a first sleeve nipple (pipe joint) 63. The second fuel pressure-supply path is formed within a second sleeve nipple (pipe joint). The high-pressure fuel portions then flow into the high-pressure fuel pipe 6, and thereafter join together halfway through the high-pressure fuel pipe 6. The joined flow is supplied from the high-pressure fuel pipe 6 into the common rail 1 and is distributed from the common rail 1 into the injectors 2.

The ECU 10 includes a microcomputer of a known structure. The microcomputer includes a CPU for performing control and arithmetic processings, storage devices (memories such as EEPROM and RAM) for storing various programs and data, an input circuit, an output circuit, a power supply circuit, an injector drive circuit (EDU), and a pump drive circuit. As shown in FIG. 2, the ECU 10 is constructed in such a manner that a voltage signal provided from a fuel pressure sensor (fuel pressure detector) 75 installed in the common rail 1 or in the high-pressure fuel pipe 6 (7) and sensor signals provided from various sensors are converted from analog to digital by an A/D converter and are thereafter inputted to the microcomputer incorporated in the ECU 10. The ECU 10 is constructed in such a manner that when an ignition switch (not shown) is turned ON (IG, ON), actuators (e.g., the electromagnetic valves 3 and the suction metering valve 5) of control parts for the plurality of injectors 2 and the supply pump 4 are controlled electronically in accordance with control programs stored in memory.

The microcomputer is connected to a crank angle sensor 71, an accelerator position sensor 72, a cooling water temperature sensor 73, and a fuel temperature sensor 74. The crank angle sensor 71 acts as an operating condition detector for detecting a state of operation and operating conditions. The crank angle sensor 71 detects a crank angle of the engine crank shaft. The accelerator position sensor (engine load detector) 72 detects an accelerator position (ACCP). The cooling water temperature sensor 73 detects an engine cooling water temperature (THW) The fuel temperature sensor 74 detects a pump suction-side temperature of fuel introduced into the supply pump 4, e.g., the temperature of fuel flowing through the fuel outlet path 17 extending from the feed pump 13 to the first and second plunger chambers 51, 51 and also through the fuel sump 18 in the suction metering valve 5 and the first and second fuel suction paths 23.

The crank angle sensor 71 includes an electromagnetic pickup coil disposed in position to an outer periphery of an NE timing rotor (not shown). The NE timing rotor is mounted on the engine crank shaft or the pump drive shaft (cam shaft) 11 of the supply pump 4. A plurality of convex teeth are arranged at predetermined angles on the outer periphery surface of the NE timing rotor. In this embodiment, as shown in the timing chart of FIG. 3, four convex teeth are provided at predetermined rotational angles (180° CA) for determining reference positions of the cylinders (top dead center positions: TDC positions of the cylinders #1, #3, #4, and #2). Furthermore, two convex teeth are provided at predetermined rotational angles (360° CA) for determining suction starting times of the supply pump 4 (top dead center positions: TDC position of the first plunger 41 in the first pump element and TDC position of the second plunger 42 in the second pump element).

A cam top of the first pump element is BTDC 102° CA relative to the TDC position of cylinder #1. A cam top of the second pump element is BTDC 102° CA relative to the TDC position of cylinder #4. FIG. 3 shows a one pressure-supply two-injection type device, wherein fuel injection is performed twice (for two cylinders) during a single pressure-supply. The convex teeth on the NE timing rotor repeat approaching and leaving the crank angle sensor 71, whereby a pulse-like rotational position signal (NE signal pulse), especially an NE signal pulse synchronized with the rotational speed (pump rotational speed) of the supply pump 4, is outputted by electromagnetic induction from the crank angle sensor 71. The ECU 10 measures an interval time of NE signal pulses outputted from the crank angle sensor 71 and thereby functions as a rotational speed detector for detecting a rotational speed of the engine (NE: hereinafter referred to as the "engine speed").

The ECU 10 includes an injection quantity determiner, an injection timing determiner, an injection period determiner, and an injecter driver. The injection quantity determiner calculates a basic injection quantity (target injection quantity: Q) from both the engine speed (NE) detected by the rotational speed detector such as the crank angle sensor 71 and the accelerator position (ACCP) detected by the accelerator sensor 72. The injection timing determiner calculates a command injection timing (TFIN) from both the engine speed (NE) and the target injection quantity (Q). The injection period determiner calculates a command injection pulse duration (injection command pulse length, command injection period: TQ) from both the target injection quantity (Q) and a common rail pressure (NPC) detected by the fuel pressure sensor 75. The injector driver applies a pulse-like injector drive current to the electromagnetic valve 3 of the injector 2 in each cylinder through the injector drive circuit.

The ECU 10 includes a fuel pressure controller which calculates an optimum fuel injection pressure matching operating conditions or the state of operation of the engine and which drives the solenoid coil of the suction metering valve 5 through the pump drive circuit. The fuel pressure controller includes a fuel pressure determiner for calculating a target common rail pressure (target fuel pressure: PFIN) based on both the engine speed (NE) and the target injection quantity (Q). For achieving this target fuel pressure (PFIN), the fuel pressure controller is constructed so as to adjust a pump drive current to be applied to the solenoid coil 26 of the suction metering valve 5 and control a pressure-supply quantity (pump discharge quantity or pump pressure-supply quantity) of the fuel which is discharged into the common rail 1 by the supply pump 4.

Preferably, for the purpose of improving the fuel injection quantity controlling accuracy, the fuel pressure-supply quantity or fuel discharge quantity in the supply pump 4 is feedback-controlled by PI (proportional Integral) control so that the common rail pressure (actual fuel pressure: NPC) detected by the fuel pressure sensor 75 becomes almost equal to the target fuel pressure (PFIN). More preferably, for the purpose of further improving the fuel injection quantity controlling accuracy, the pump drive current to be applied to the solenoid coil 26 of the suction metering valve 5, which current has a correlation with the fuel pressure-supply quantity or fuel discharge quantity in the supply pump 4, is feedback-controlled by PI control so that the common rail pressure (NPC) detected by the fuel pressure sensor 75 becomes almost equal to the target fuel pressure (PFIN) It is preferable that the control of the pump drive current be done in terms of DUTY control.

A last-time learning value (a last-time current learning value in this embodiment) acquired at the time of learning control for learning variations in the fuel pressure-supply quantity relative to the control command value in the supply pump 4, which corresponds to a mechanical individual value or a physical change of the supply pump 4, is stored updatedly in memory such as EEPROM used in this embodiment. As an initial value of the last-time current learning value, a drive current value relative to a fuel discharge quantity in idling in a reference characteristic (machine difference median product) of the supply pump 4 is stored in advance. Furthermore, a last-time integral term to be used for calculating a feedback correction quantity is stored updatedly in memory such as EEPROM.

The integral term (this-time integral term) for calculating the feedback correction quantity is obtained by adding an integral compensation quantity to the last-time integral term. The integral compensation quantity is updated in accordance with a pressure deviation ($\Delta P$) between the target fuel pressure (PFIN) and the actual fuel pressure (NPC). The ECU 10 used in this embodiment includes an integral term calculator for adding an integral compensation quantity (integral updating quantity: DI) to a last-time integral term (FBI) to calculate a this-time integral term (FBI). The integral compensation quantity is updated in accordance with the pressure deviation ($\Delta P$) between the target fuel pressure (PFIN) and the actual fuel pressure (NPC). An integral term holder stops updating the integral compensation quantity (integral updating quantity: DI) used for calculating a feedback correction quantity and holds the last-time integral term (FBI) when it is determined that a pump control defect (FAIL 2) such as pump pressure-supply shortage (HUSOKU 2) caused for example by the incorporation of a large amount of air into the cylinder(s) of one or more pressure-supply systems in the supply pump 4 is occurring. Alternatively, an integral term clearer clears the integral compensation quantity (integral updating quantity: DI) used in calculating a feedback compensation quantity and also clears the last-time integral term to clear this-time integral term when it is determined that a pump control defect (FAIL 2) such as pump pressure-supply shortage (HUSOKU 2) caused for example by the incorporation of a large amount of air into the cylinder(s) of one or more pressure-supply systems in the supply pump 4.

Figure 4:
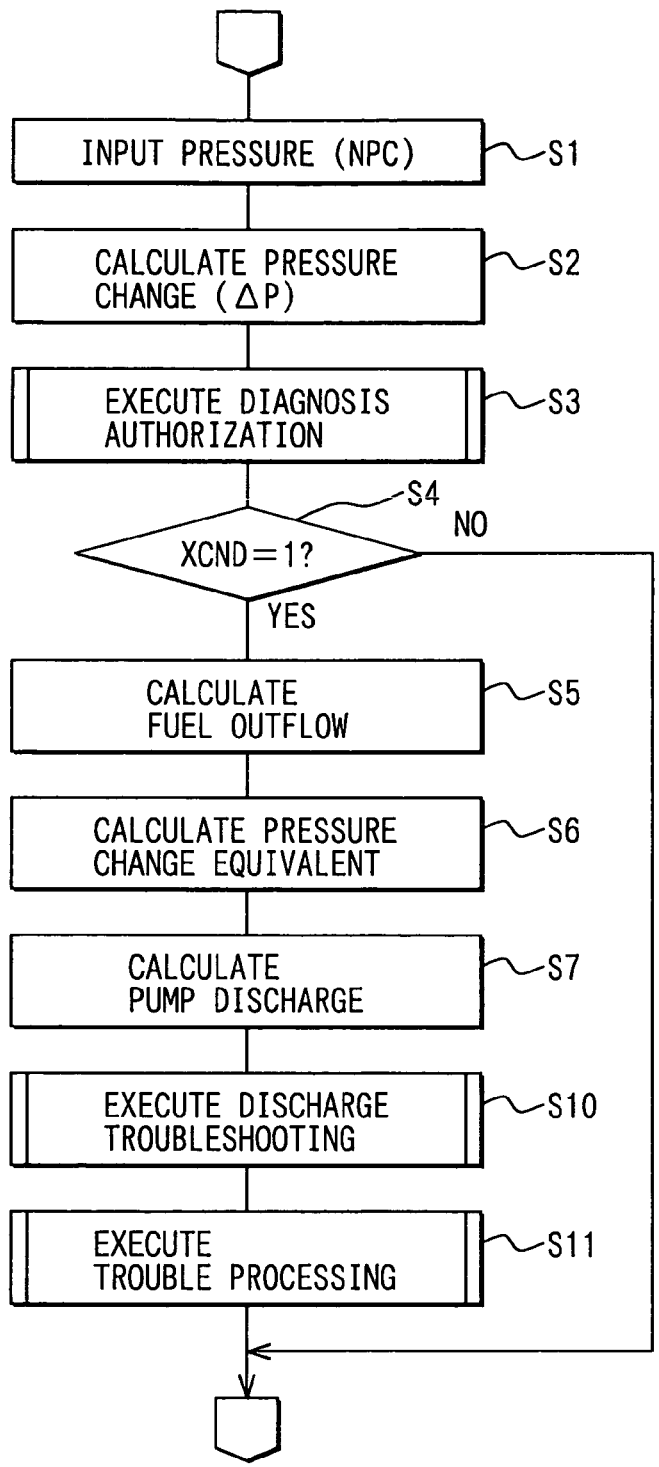
FIG. 4 is a flowchart of a pump discharge quantity troubleshooting method in accordance with the first embodiment of the present invention.

A troubleshooting method for the supply pump 4 in this first embodiment will now be described with reference to FIGS. 1 to 11. FIG. 4 is a flowchart showing a pump discharge quantity troubleshooting method conducted by the ECU 10.

A main routine in FIG. 4 is executed at every predetermined operation timing after turning ON (IG, ON) the ignition switch. In this embodiment, as shown in the timing chart of FIG. 3, the cam top of the first pump element is BTDC 102° CA relative to the TDC position of cylinder #1 and the cam top of the second pump element is BTDC 102° CA relative to the TDC position of cylinder #4, therefore, "BTDC 108° CA" as the closest interrupt angle is assumed to be an operation timing.

First, a common rail pressure (NPC) detected by the fuel pressure sensor 75 is inputted (Step S1). Next, a common rail pressure change quantity ($\Delta P$) before and after the pressure-supply period in at least one of the plurality of pressure-supply systems is calculated. That is, a common rail pressure change quantity ($\Delta P$) in a predetermined crank angle (e.g., 360° CA) period is calculated (Step S2). For example, a pressure difference between a last-time common rail pressure (PCi-1) before 360° CA and a this-time common rail pressure (PCi) after 360° CA is determined. Next, diagnosis authorization condition determination is executed using a diagnosis authorization condition determining routine of FIG. 5 (Step S3) Then, it is determined whether Diagnosis Authorization Flag is set (XCND=1) or not (Step S4). When the answer is negative, i.e., XCND=0, the pump discharge quantity troubleshooting is ended without executing Step S5 and subsequent processings in the main routine shown in FIG. 4.

When the answer in Step S4 is affirmative, i.e., XCND=1, a total amount of fuel flowing out from the plurality of injectors 2 is calculated in a pump pressure-supply period in which at least one of the plurality of pressure-supply systems supplies the fuel under pressure. That is, a total amount of fuel flowing out in a predetermined crank angle (e.g., 360° CA) period is calculated (Step S5).

More specifically, total outflow quantity in a 360° CA period is determined by adding the following: the total amount of fuel injection quantity (QINJ) in a predetermined crank angle (e.g., 360° CA) period; the total amount of injector clearance leakage quantity (injector static leakage quantity: QSL) in a predetermined crank angle (e.g., 360° CA) period; and the total amount of injector switching leakage quantity (injector dynamic leakage quantity: QDL) in a predetermined crank angle (e.g., 360° CA) period.

The injector static leakage quantity (QSL) can be calculated using a map or an arithmetic expression from the engine speed (NE), the actual common rail pressure (NPC), and the injector leakage temperature (fuel temperature: THF).

In case of using a map, a reference value (QSLBASE) of an injector static leakage quantity is calculated using a characteristic map (a two-dimensional map) prepared by establishing a relationship between the engine speed (NE) and the actual common rail pressure (NPC) to the reference value (QSLBASE) of the injector static leakage quantity beforehand through experiments or the like. Next, a fuel temperature correction coefficient ($\alpha$) is calculated using a characteristic map (a one-dimensional map) prepared by establishing a relationship between the fuel temperature (THF) detected by the fuel temperature sensor 74 and the fuel temperature correction coefficient ($\alpha$) beforehand through experiments or the like. Subsequently, the reference value (QSLBASE) of injector static leakage quantity is multiplied by the fuel temperature correction coefficient ($\alpha$) to calculate an injector static leakage quantity (QSL) (static leakage quantity calculator).

The injector dynamic leakage quantity (QDL) is calculated using a characteristic map (a two-dimensional map) or an arithmetic expression. The characteristic map is prepared by establishing a relationship among the injection command pulse length (TQ), the actual common rail pressure (NPC), and the injector dynamic leakage quantity (QDL) beforehand through experiments or the like (dynamic leakage calculator). As to the fuel injection quantity (QINJ) in 360° CA period, since the injection of fuel into cylinder #1, cylinder #3, or cylinder #4, cylinder #2, is performed as shown in FIG. 3, the target injection quantity (Q)×2 results. The target injection quantity (Q)×2 may be substituted by a command injection quantity (QFIN)×2 obtained by adding an injection correction quantity to the actual fuel injection quantity or the basic fuel injection quantity. The injection correction quantity takes the engine cooling water temperature (THW) and fuel temperature (THF) into account.

Next, a common rail pressure change equivalent quantity is calculated. More specifically, the 360° CA common rail pressure change quantity ($\Delta P$) is multiplied by a total high-pressure fuel portion volume (V) and the resulting value is divided by a bulk modulus (E). The value obtained is designated a common rail pressure change equivalent quantity (volume necessary for $\Delta P$ rise in the high-pressure fuel portion: $\Delta V$) (Step S6). The bulk modulus E can be determined based on the actual common rail pressure (NPC) and the fuel temperature (injector leakage temperature or pump overflow temperature or supply pump inlet temperature: THF) via the following arithmetic expression (1) or a map:

$$\Delta V = (\Delta P \times V)/E \quad (1)$$

where V stands for a total volume of the high-pressure fuel portion including the common rail 2 and E stands for a bulk modulus of fuel.

Next, a pump discharge quantity (a pressure-supply quantity in one pressure-supply system) in a 360° CA period is calculated. More particularly, the common rail pressure change equivalent quantity ($\Delta V$) is subtracted from the total outflow quantity in accordance with the following arithmetic expressions (2) and (3). The value thus obtained is used as the pump discharge quantity (pressure-supply quantity in one pressure-supply system: QP) in 360° CA period (Step S7). Then, a pump discharge quantity troubleshooting is executed using a subroutine shown in FIGS. 6 and 7 (Step S10). Next, an upon-trouble-detection processing is carried out using the subroutine shown in FIG. 8 (Step S11).

$$\text{Total outflow quantity} = (QSL \times 4) + (QDL \times 2) + (QINJ \times 2) \quad (2)$$

$$QP = \text{Total outflow quantity} - \Delta V \quad (3)$$

Figure 5:
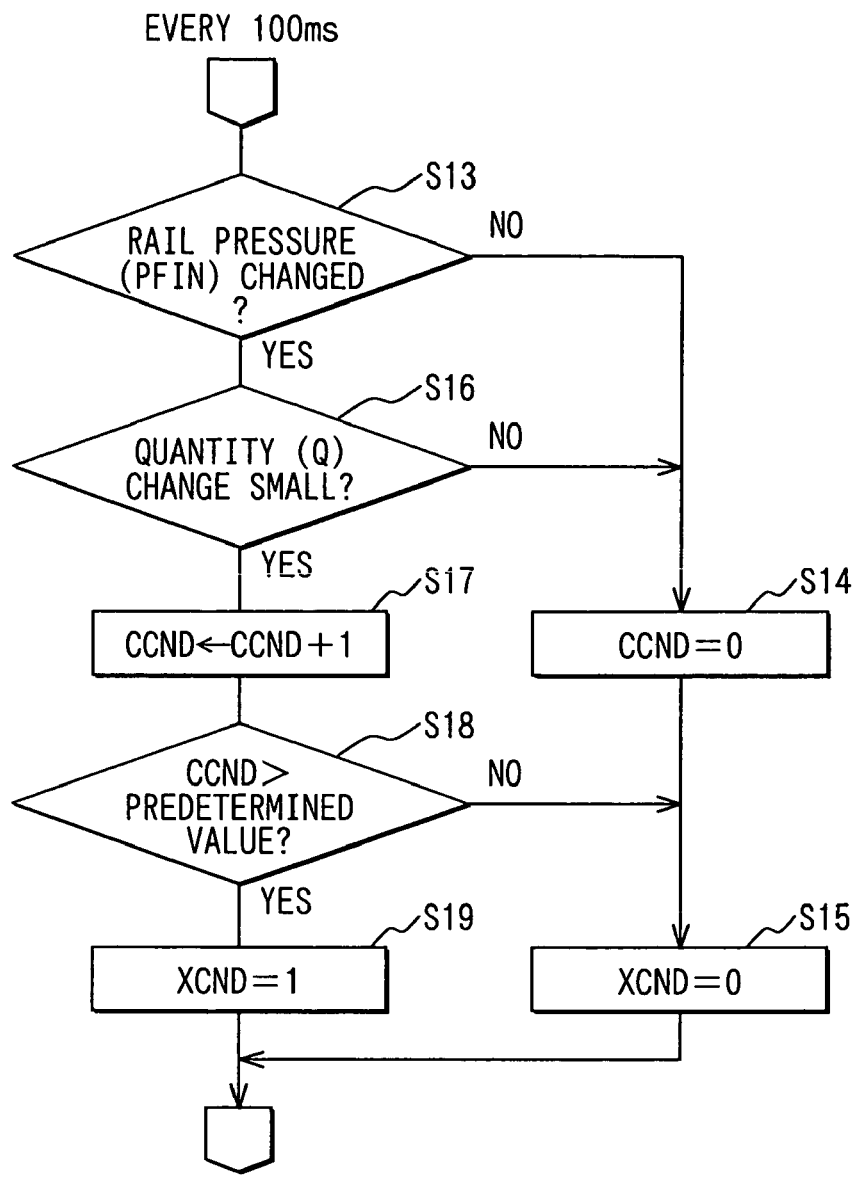
FIG. 5 is a flowchart of a diagnosis authorization condition determining process in accordance with the first embodiment of the present invention.

FIG. 5 is a flowchart showing details of the diagnosis authorization condition determination of Step S3 in the main routine of FIG. 4. The diagnosis authorization condition determination routine of FIG. 5 is executed at every predetermined control timing (e.g., 100 ms) after turning ON the ignition switch (IG, ON). First, it is determined whether the target common rail pressure (PFIN) is small or not between the last-time and this-time values (Step S13). When the answer is negative, it is determined that the engine is in a state of acceleration or deceleration and a diagnosis authorization counter (CCND) is reset (Step S14). Next, a Diagnosis Authorization Flag (XCND) is cleared (Step S15). Thereafter, the processing flow shifts from the routine of FIG. 5 to the determination process of Step S4 in FIG. 4, in which the answer is negative and the pump discharge quantity troubleshooting is terminated.

When the answer in Step S13 is affirmative, it is determined whether the change in the target injection quantity (Q) is small or not between the last-time and this-time values (Step S16). When the answer is negative, it is determined that the engine is in a state of acceleration or deceleration and the processing flow advances to Step S14.

When the answer in Step S16 is affirmative, it is determined that the engine is in a steady state of operation. Furthrmore, the diagnosis authorization counter (CCND) is incremented (Step S17). Next, it is determined whether the steady state of the engine has continued for a predetermined time or not. That is, it is determined whether the CCND value is larger than a predetermined value or not (Step S18). When the answer is negative, the processing flow advances to Step S15.

When the answer in Step S18 is affirmative, it is determined that the steady state of the engine has continued for the predetermined time and Diagnosis Authorization Flag (XCND) is set (Step S19). Thereafter, the processing flow shifts from the routine of FIG. 5 to the determination processing of Step S4 in FIG. 4, in which the answer is affirmative and the pump discharge quantity troubleshooting is continued.

As in this embodiment, when two pressure-supply systems #1 and #2 are provided and the pump discharge quantity or the pump pressure-supply quantity is metered with one suction metering valve 5 for all of the pressure-supply systems, the one pressure-supply system #1 becomes unable to effect pressure-supply of the fuel and the other pressure-supply system #2 is in a normal state, as shown in FIG. 3, because of one of to reasons. First, because a fuel pressure-supply path (e.g., the first fuel pressure-supply path 62 extending from the first plunger chamber 51 to the first discharge vale 61) in the abnormal pressure-supply system #1 or the first discharge valve (high-pressure check valve) 61 is blocked by a foreign matter or the like or undergoes a full open trouble due to the inclusion of the foreign matter or because a fuel suction path (e.g., the fuel outlet path 17, the fuel sump 18 in the suction metering valve 5, and the first fuel suction path 23, in the area from the feed pump 13 to the first plunger chamber 51). Second, because the suction check valve (the first suction valve 31) is blocked by a foreign matter or the like or undergoes a full open trouble due to inclusion of a foreign matter.

In this embodiment, a pump pressure-supply surplus failure (KAJO1) or a pump pressure-supply shortage failure (HUSOKU1) caused by the above full open or full closed trouble of a pressure-supply system is compared with the first decision value (first decision threshold $\pm\alpha$, see FIG. 12). A check is made to see if a pump failure is occurring in at least one of the two pressure-supply systems.

The pump pressure-supply shortage may occur due to the above pump pressure-supply shortage failure (HUSOKU1) or when the supply pump 4 sucks a large amount of air together with fuel into the cylinders from the fuel tank 9 due to the residual amount of fuel in the fuel tank 9 being low (before a complete shortage of fuel) and when the level of liquid fuel (fluid level) in the fuel tank 9 is allowed to swing with a turning motion of the vehicle. Alternatively, the pump pressure-supply shortage or surplus is likely to occur even upon occurrence of a slide defect of the slide portions in one or more pressure-supply systems (first and second pump elements) in the supply pump 4 (e.g., a slide defect between the slide bores in the first and second cylinder heads 33, 34 and the outer peripheries of the first and second plungers 41, 42) or an operation defect of the movable portions (e.g., the first and second plungers 41, 42) in one or more pressure-supply systems in the supply pump 4.

Thus, in this embodiment, a pump control defect (KAJO2 or HUSOKU2) is compared with the second decision value (second decision threshold $\pm\alpha$), see FIG. 13. The pump control defect may be caused by one of a variety of things such as the incorporation of a large amount of air into the cylinder of any of the two pressure-supply systems in the supply pump 4 before a complete shortage of fuel; a slide defect of the slide portion; or an operation defect of the movable portion in any of the two pressure-supply systems). The second decision value is given by the pump pressure-supply quantity in one pressure-supply system while the supply pump 4 is in a normal condition, as shown in the flowchart of FIG. 7.

Additionally, a check is made to see if there occurs a pump control defect caused by the incorporation of a large amount of air into the cylinder of at least one of the two pressure-supply systems before a complete shortage of fuel or a pump control defect caused by a slide defect of the slide portion or an operation defect of the movable portion. The second decision value is smaller than the first decision value.

Figure 6:
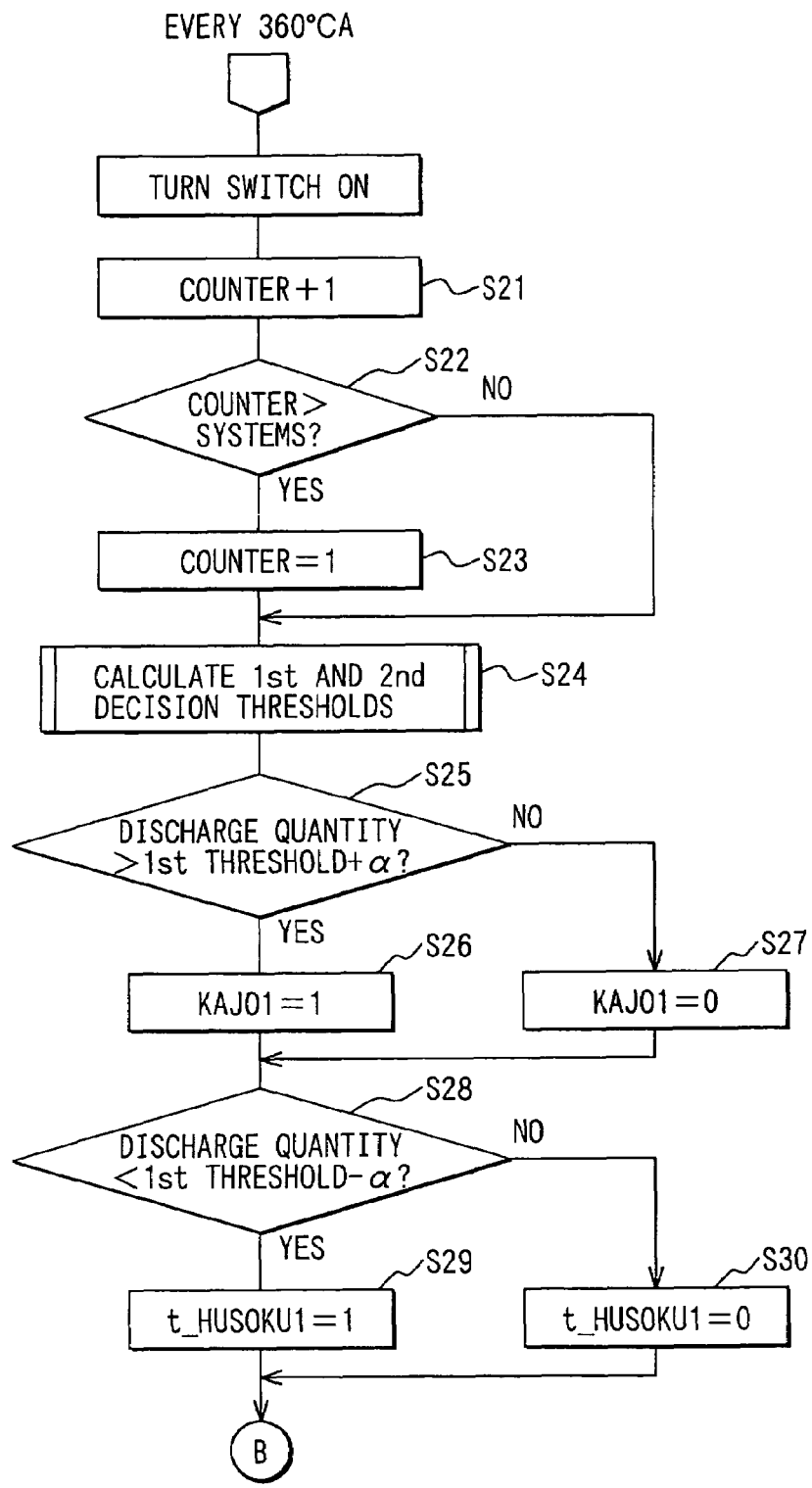
FIGS. 6–7 present a flowchart of a pump discharge quantity troubleshooting process in accordance with the first embodiment of the present invention.
Figure 7:
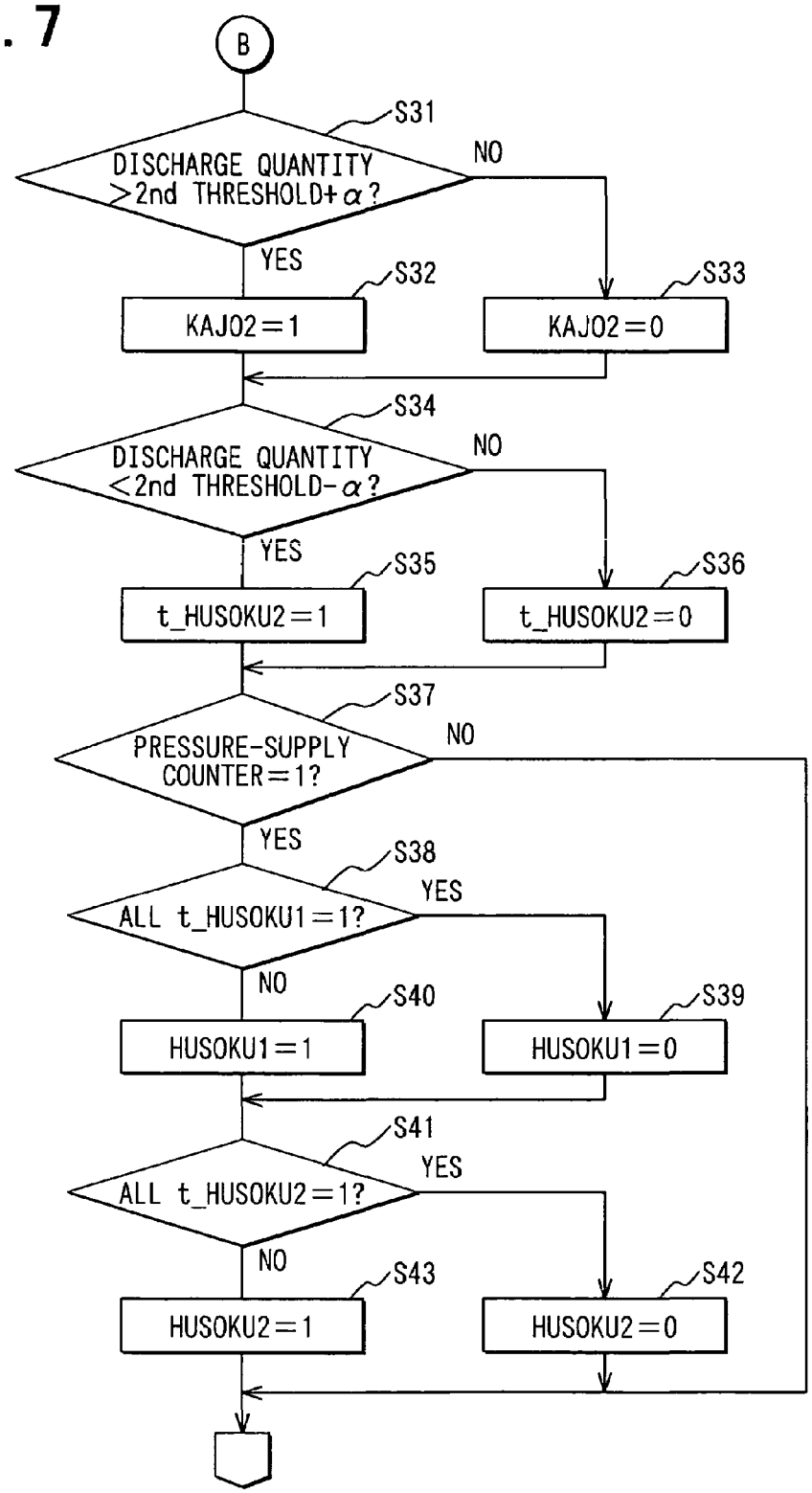

FIGS. 6 and 7 are flowcharts showing the details of the pump discharge quantity troubleshooting of Step S10 in the main routine of FIG. 4. The pump discharge quantity troubleshooting routine is executed at every predetermined control timing (e.g., 360° CA) after turning ON (IG, ON) the ignition switch. First of all, the pressure-supply system counter is incremented by one (Step S21). Then, it is determined whether the number of pressure-supply system counters is larger than the number of pressure-supply systems or not (Step S22). When the answer in Step S22 is negative, the processing flow advances to Step S24.

On the other hand, when the answer in Step S22 is affirmative, the pressure-supply system counter is set to one (Step S23). Next, first and second decision values (first and second decision thresholds ±α) are calculated based on the pump pressure-supply quantity for each fuel pressure-supply system in case of the supply pump 4 being in normal condition (Step S24). In this case, there may be adopted a method wherein a pump pressure-supply quantity is calculated based on the drive current value for the electromagnetic valve in the suction metering valve (SCV) 5, for example. This calculation is completed for each pressure-supply system in the case of all the pressure-supply systems in the supply pump 4 being in normal condition. Furthermore, the engine speed (NE) and first and second decision values (first and second decision thresholds ±α) are calculated based on the pump pressure-supply quantity thus calculated.

Then, it is determined whether the pump discharge quantity in 360° CA period of the fuel discharged from one or more pressure-supply systems in the supply pump 4 is larger then the first decision value (first decision threshold +α) or not (Step S25). When the answer in Step S25) is affirmative, it is determined that a pump pressure-supply surplus failure is occurring in only a specific pressure-supply system and KAJO1 (surplus counter) is set to one (Step S26). Thereafter, the processing flow advances to Step S28.

When the answer in Step S25 is negative, it is determined that pump pressure-supply surplus is not occurring in any of the pressure-supply systems, and KAJO1 (surplus counter) is reset to zero (Step S27).

Next, it is determined whether the pump discharge quantity in 360° CA period of the fuel discharged from one or more pressure-supply systems in the supply pump 4 is smaller than the first decision value (first decision threshold −α) or not (Step S28). When the answer in Step S28 is affirmative, t_HUSOKU1 (a temporary shortage counter) is set to one (Step S29). Thereafter, the processing flow advances to a determination processing of Step S31.

On the other hand, when the answer in Step S28 is negative, t_HUSOKU1 (a temporary shortage counter) is reset to zero (Step S30).

Next, it is determined whether the pump discharge quantity in 360° CA period of the fuel discharged from one or more pressure-supply systems in the supply pump 4 is larger than the second decision value (second decision threshold +α) or not (Step S31). When the answer in Step S31 is affirmative, it is determined that a pump pressure-supply surplus failure is occurring in only a specific pressure-supply system and KAJO2 (surplus counter) is set to one (step 32). Thereafter, the processing flow advances to Step S34.

When the answer is Step S31 is negative, it is determined that pump pressure-supply surplus is not occurring in any of the pressure-supply systems and KAJO2 (surplus counter) is reset to zero (Step S33).

Then, it is determined whether the pump discharge quantity in 360° CA period of the fuel discharged from one or more pressure-supply systems in the supply pump 4 is smaller than the second decision value (second decision threshold −α) or not (Step S34). When the answer in Step S34 is affirmative, t_HUSOKU2 (a temporary shortage counter) is set to one (Step S35). Thereafter, the processing flow advances to Step S37.

On the other hand, when the answer in Step S34 is negative, t_HUSOKU2 (a temporary shortage counter) is reset to zero (Step S36).

Next, it is determined whether the pressure-supply system counter is set to one or not (Step S37). When the answer in Step S37 is negative, the processing flow leaves the routine of FIGS. 6 and 7.

When the answer in Step S37 is affirmative, it is determined whether t_HUSOKU1 [k] (a temporary shortage counter) is set to one or not in all the pressure-supply systems (Step S38). When the answer in Step S38 is affirmative, it is determined that the pump discharge quantity is short in all of the pressure-supply systems and this state is regarded as a complete shortage of fuel and is excluded from the troubleshooting. Therefore, HUSOKU1 (shortage counter) is reset to zero (Step S39). Thereafter, the processing flow advances to Step S41.

When the answer in Step S38 is negative, it is determined that a pump pressure-supply shortage failure is occurring in only a specific pressure-supply system and HUSOKU1 (shortage counter) is set to one (Step S40).

Next, it is determined whether t_HUSOKU2 [k] (a temporary shortage counter) is set to one or not in all the pressure-supply systems (Step S41). When the answer in Step S41 is affirmative, it is determined that the pump discharge quantity in 360° CA period is short in all the pressure-supply systems and this state is regarded as a complete shortage of fuel and is excluded from troubleshooting. Therefore, HUSOKU2 (shortage counter) is reset to zero (Step S42). Thereafter, the processing flow leaves the routine of FIGS. 6 and 7.

When the answer in Step S41 is negative, it is determined that a pump pressure-supply shortage failure is occurring in only a specific pressure-supply system and HUSOKU2 (shortage counter) is set to one (Step S43). Thereafter, the processing flow leaves the routine of FIGS. 6 and 7.

Figure 8:
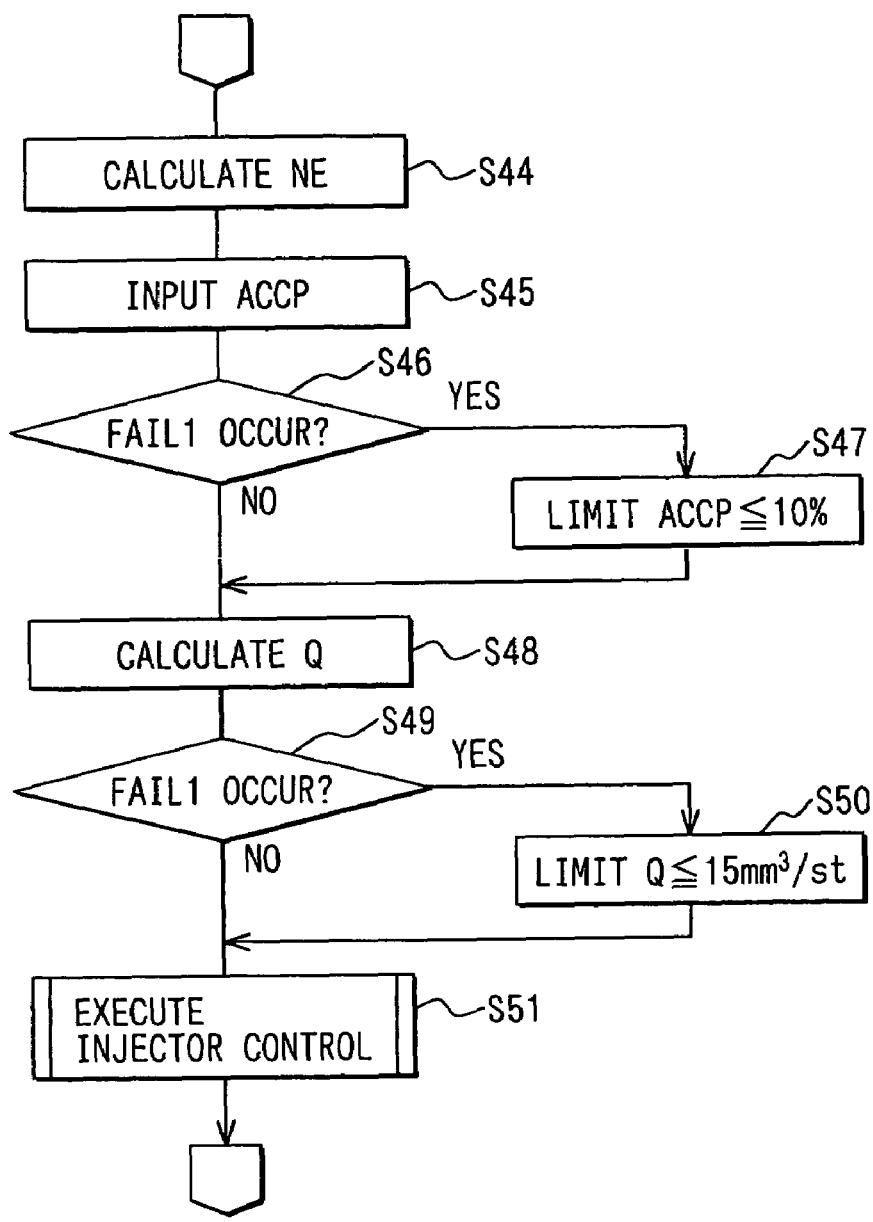
FIG. 8 is a flowchart of an upon-pump trouble-detection process for an injector in accordance with the first embodiment of the present invention.

Next, FIG. 8 is a flowchart showing the details of the injection quantity controlling process for the injector 2 as an example of the upon-trouble-detection processing of Step S11 in the main routine of FIG. 4. The upon-trouble-detection processing of FIG. 8 is executed at every predetermined control timing (e.g., 180° CA) after turning ON the ignition switch (IG, ON) (in the case of a four-cylinder engine). First, the engine speed (NE) is calculated (Step S44). Next, an accelerator position (ACCP) is inputted (Step S45).

Then, it is determined whether a pump failure (FAIL1) such as a pump pressure-supply shortage failure or a pump pressure-supply surplus failure is occurring in at least one of the two pressure-supply systems or not. That is, it is determined whether at least one of the foregoing KAJO1 (surplus counter) in the subroutine of FIG. 6, the foregoing HUSOKU1 (shortage counter) in the subroutine of FIG. 7, and Failure Decision Flag (PFAIL1) in a subroutine of FIG. 15 to be described later, is set to one or not (Step S46). When the answer in Step S46 is affirmative, the accelerator position (ACCP) is limited to an upper-limit value (e.g., 10%) or less (Step S47). Thereafter, the processing flow advances to Step S48.

On the other hand, when the answer in Step S46 is negative, a target injection quantity (Q) is calculated based on the engine speed (NE), the accelerator position (ACCP), and a characteristic map prepared in advance by experiment and measurement (Step S48).

Next, it is determined whether a pump failure (FAIL1) such as a pump pressure-supply shortage failure or a pump pressure-supply surplus failure is occurring in at least one of the two pressure-supply systems (Step S49). When the answer in Step S49 is affirmative, the target injection quantity (Q) is limited to an upper-limit value (e.g., 15 mm³/st) (Step S50). Thereafter, an injection quantity control for the injector 2 is executed in Step S51. When the answer in Step S49 is negative, the injection quantity control for the injector 2 is executed. More specifically, a command injection timing (TFIN) is calculated from the engine speed (NE) and the target injection quantity (Q). Subsequently, a command injection period (injector drive time, injection command pulse length: TQ) is calculated from the target injection quantity (Q) and the common rail pressure (NPC). Then, a pulse-like injector drive current (INJ injection command pulse) is applied to the electromagnetic valve 3 of the injector 2 in each cylinder through the injector drive circuit (EDU). Thereafter, the processing flow leaves the routine of FIG. 8.

Figure 9:
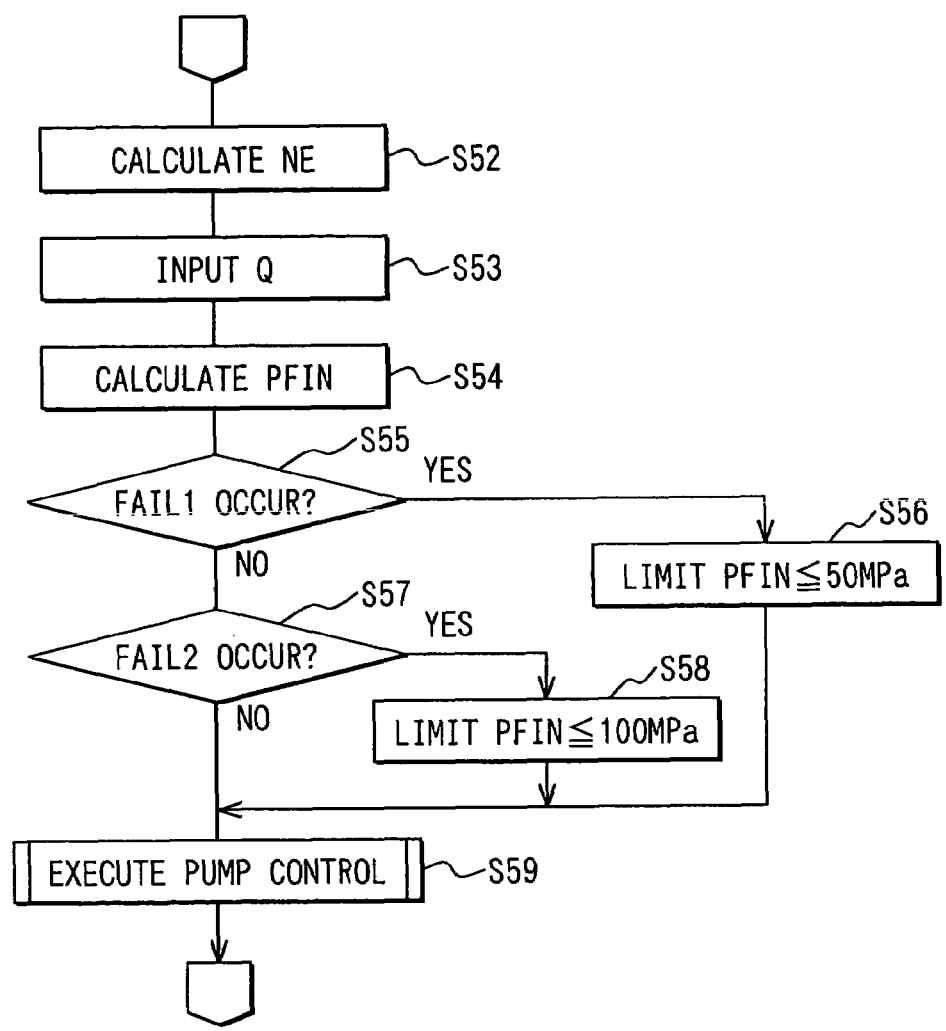
FIG. 9 is a flowchart of an upon-pump trouble-detection process for a supply pump in accordance with the first embodiment of the present invention.

FIG. 9 is a flowchart showing the details of a fuel pressure control processing for the supply pump 4 as an example of the upon-trouble-detection processing of Step S11 in the main routine of FIG. 4. The flowchart of FIG. 9 is executed at every 360° CA (in the case of this embodiment). First, the engine speed (NE) is calculated (Step S52). Next, the target injection quantity (Q) is inputted and a command injection quantity (QFIN) is calculated by adding to the target injection quantity (Q) an injection correction quantity which takes into account the engine cooling water temperature (THW) and the fuel temperature (THF) (injection quantity determiner: Step S53). Next, a target fuel pressure (PFIN) is calculated using the engine speed (NE), the command injection quantity (QFIN), and a characteristic map prepared in advance by experiment and measurement (fuel pressure determiner: Step S54).

Next, it is determined whether a pump failure (FAIL1) such as a pump pressure-supply shortage failure or a pump pressure-supply surplus failure is occurring in at least one of the two pressure-supply systems or not. More specifically, it is determined whether at least one of the KAJO1 (surplus counter) in the subroutine of FIG. 6, HUSOKU1 (shortage counter) in the subroutine of FIG. 7, and Failure Decision Flag (PFAIL1) in a subroutine of FIG. 15 to be described later, is set to one or not (Step S55). When the answer in Step S55 is affirmative, the target fuel pressure (PFIN) is limited to a predetermined value (e.g., 50 MPa) or less (Step S56). Thereafter, a pump control (fuel pressure control) processing of Step S59 is executed.

When the answer in Step S55 is negative, it is determined whether a pump control defect (FAIL2) such as pump pressure-supply shortage (HUSOKU2) caused by the incorporation of a large amount of air into the cylinder(s) of one or more pressure-supply systems in the supply pump 4 before a complete shortage of fuel or caused by a slide defect of the slide portion or pump pressure-supply surplus (KAJO2) caused by an operation defect of the movable portion, is occurring or not. More specifically, it is determined whether at least one of KAJO2 (surplus counter) in the subroutine of FIG. 7, HUSOKU2 (shortage counter) in the subroutine of FIG. 7, and Control Defect Flag (PFAIL2) in a subroutine of FIG. 15 to be described later, is set to one or not (Step S57). When the answer in Step S57 is affirmative, the target fuel pressure (PFIN) is limited to a predetermined value (e.g., 100 MPa) or less (Step S58) Thereafter, a pump control processing (fuel pressure control) of Step S59 is executed.

When the answer in step 57 is negative, the pump discharge quantity in the supply pump 4 is controlled to control the fuel pressure (common rail pressure) within the common rail in accordance with a pressure deviation ($\Delta P$) between the common rail pressure (NPC) detected by the fuel pressure sensor 75 and the target fuel pressure (PFIN) More specifically, the fuel pressure-supply quantity or fuel discharge quantity in the supply pump 4 is feedback (FB)-controlled by PI (proportional integral) control in such a manner that the actual fuel pressure (NPC) becomes almost equal to the target fuel pressure (PFIN) (Step S59). Thereafter, the processing flow leaves the routine of FIG. 9.

Figure 10:
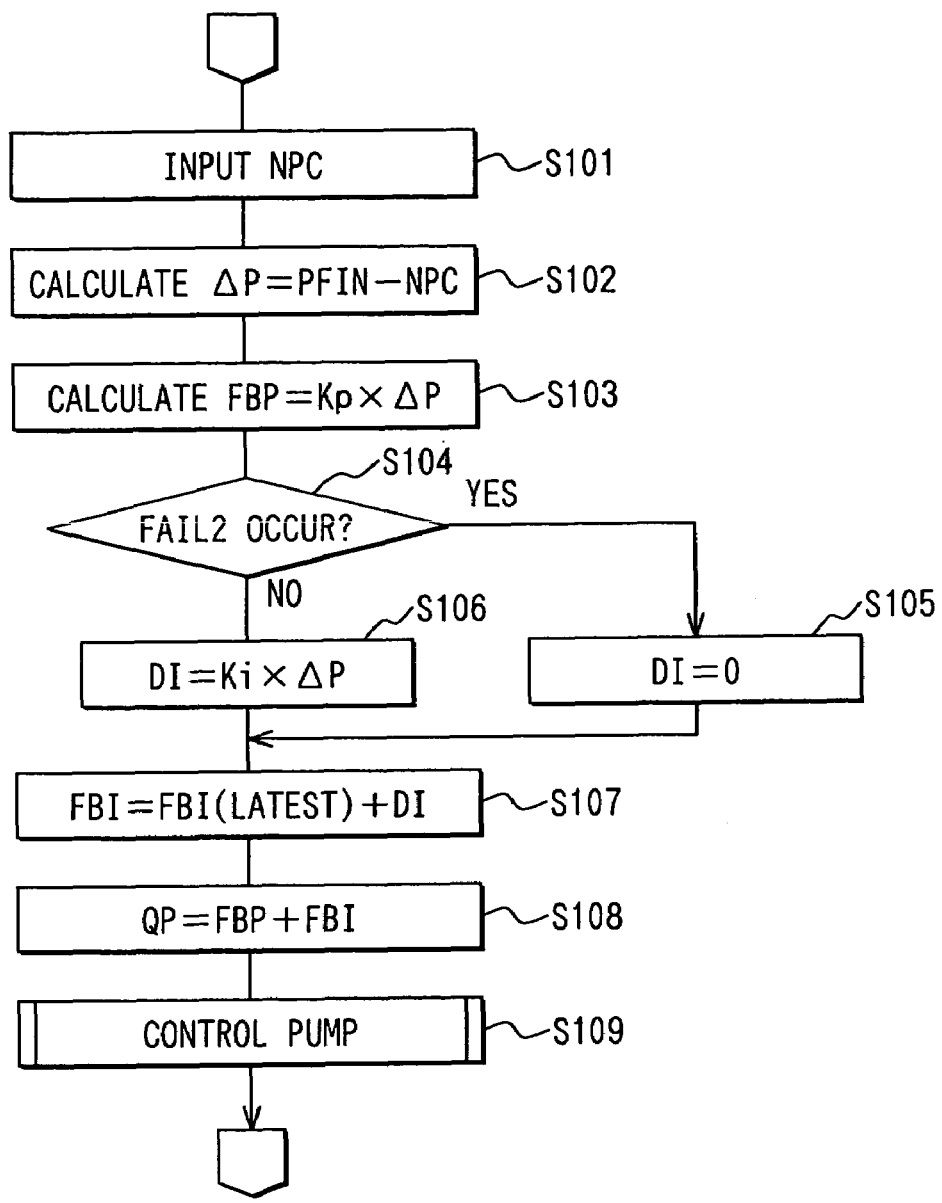
FIG. 10 is a flowchart of a pump control process of the process of FIG. 9.

Next, FIG. 10 is a flowchart showing the details of the pump control (normal pressure FB control, fuel pressure control) of Step S59 in the subroutine of FIG. 9. The subroutine of FIG. 10 is executed at every predetermined timing (e.g., 360° CA) after turning ON (IG, ON) of the ignition switch. First, the common rail pressure (NPC) detected by the fuel pressure sensor 75 is inputted (Step S101). Next, a pressure deviation ($\Delta P$=PFIN−NPC) between the target fuel pressure (PFIN) and the common rail pressure (NPC) is calculated (Step S102). Then, a proportional gain (Kp) is multiplied by the pressure deviation ($\Delta P$) to calculate a this-time proportional term (FBP) which is used in calculating a feedback correction quantity (proportional term calculator, Step S103).

Next, it is determined whether a pump control defect (FAIL2) such as pump pressure-supply shortage (HUSOKU2) caused by the incorporation of a large amount of air into the cylinder(s) of one or more pressure-supply systems in the supply pump 4 before a complete shortage of fuel or caused by a slide defect of the slide portion or pump pressure-supply surplus (KAJO2) caused by an operation defect of the movable portion is occurring or not. More particularly, it is determined whether at least one of KAJO2 (surplus counter) in the subroutine of FIG. 7, HUSOKU2 (shortage counter) in the subroutine of FIG. 7, and Control Defect Flag (PFAIL2) in a subroutine of FIG. 15 to be described later, is set to one or not (Step S104). When the answer in Step S104 is affirmative, the updating of the integral compensation quantity (integral update quantity: DI), which is updated in accordance with a pressure difference ($\Delta P$) between the target fuel pressure (PFIN) and the common rail pressure (NPC), is stopped (Step S105). Thereafter, the processing flow advances to an integral term calculation processing of Step S107.

When the answer in Step S104 is negative, an integral gain (Ki) is multiplied by the pressure deviation between the target fuel pressure (PFIN) and the common rail pressure (NPC) to update the integral compensation quantity (integral update quantity: DI) (Step S106). Next, the integral compensation quantity (integral update quantity: DI) and the last-time integral term (last-time value: FBI) stored in memory such as EEPROM are added to calculate a this-time integral term (FBI) (integral term calculator: Step S107). Then, a feedback correction quantity is calculated based on the this-time proportional term (FBP) and the this-time integral term (FBI) (correction quantity calculator: Step S108). The feedback quantity is calculated from an integral term which is updated in accordance with the pressure deviation ($\Delta P$) between the actual fuel pressure (NPC) and the target fuel pressure (PFIN) and a proportional term which increases or decreases to make zero the pressure deviation ($\Delta P$) between the actual fuel pressure (NPC) and the target fuel pressure (PFIN). The feedback correction quantity in this embodiment is calculated as a pump command discharge quantity (control command value: QP). The this-time integral term (FBI) calculated is stored as a last-time integral value (FBI: last-time value) in memory such as EEPROM.

Next, control of the suction metering valve 5 in the supply pump 4 is executed (Step S109). More specifically, the pump drive current (SCV drive current) to be applied to the solenoid coil 26 in the suction metering valve 5 is feedback-controlled by PI (proportional integral) control in such a manner that the common rail pressure (NPC) becomes almost equal to the target fuel pressure (PFIN). This is carried out by converting the pump command discharge quantity (QP) to a target drive current value (command drive current value: IPMP) with use of a predetermined conversion coefficient. For example, the pump command discharge quantity (QP) is converted to a suction command quantity by using a two-dimensional map (not shown) with pump command discharge quantity (QP) and fuel pressure as parameters, and the suction command value is converted to a target drive current value (IPMP) by using a two-dimensional map (not shown) with fuel suction quantity and engine speed (NE) as parameters.

Figure 11A:
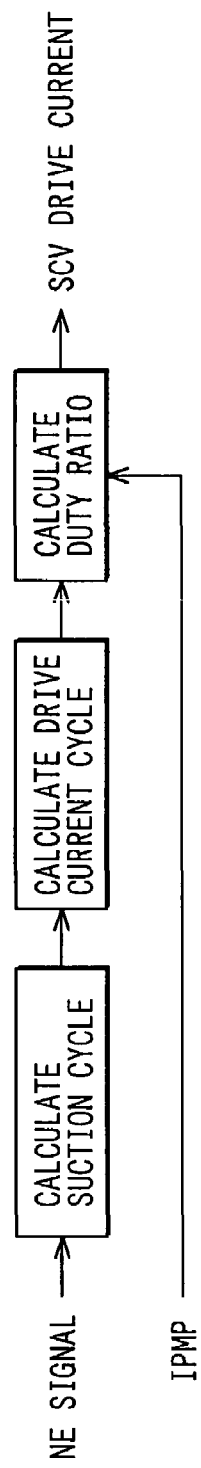
FIG. 11A is a block diagram of a control logic of an engine control unit in accordance with the present invention.

As shown in FIGS. 2 and 11A, the ECU 10 inputs an NE signal pulse, which is synchronized with a pump rotational speed signal outputted from the crank angle sensor 71, and calculates the rotational speed (NP) of the pump. Furthermore, the ECU 10 inputs a TDC position determining signal of the first plunger 41 as the first pump element in the supply pump 4 and a TDC position determining signal of the second plunger 42 as the second pump element in the pump. Additionally, the ECU 10 calculates a pump suction cycle of the supply pump 4 from the pump rotational speed (NP) and the two TDC position discriminating signals (suction cycle calculator).

Figure 11B:
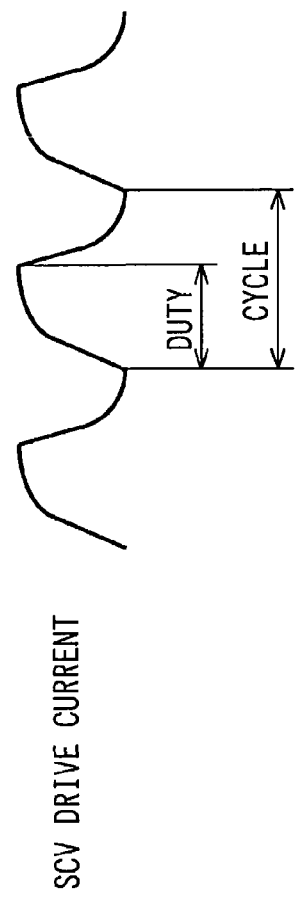
FIG. 11B is a drive current waveform in accordance with the first embodiment of the present invention.

Next, the ECU 10 calculates a drive current cycle of the suction metering valve 5 in accordance with the suction cycle of the supply pump 4 (drive current cycle determiner) Then, the ECU 10 calculates a DUTY ratio of the SCV drive current from the drive current cycle and a target drive current value (IPMP) which is necessary for the target fuel pressure (PFIN) (DUTY ratio determiner). According to a method of calculating the DUTY ratio, a DUTY value for the SCV drive current cycle is calculated based on a drive current value/DUTY value conversion map or an arithmetic expression which map is prepared by measuring a relation between the target drive current value (IPMP) and DUTY value beforehand in the ECU 10 through experiments or the like, as shown in FIG. 11B.

Then, the ECU 10 converts the DUTY value for the SCV drive current cycle to a control pulse signal (pulse-like pump drive signal) with the use of a predetermined conversion coefficient. Subsequently, the ECU 10 applies the pulse-like pump drive signal (SCV drive current) to the solenoid coil 26 in the suction metering valve 5 through the pump drive circuit. As a result, the lift quantity of the valve 25 in the suction metering valve 5 and the area of opening of the flow paths communicating with the first and second fuel suction paths 23 are adjusted corresponding to the SCV drive current. This makes it possible to control the amount of fuel to be sucked into the first and second plunger chambers 51, 52.

Thus, the pump pressure-supply quantity or pump discharge quantity of the fuel supplied under pressure from the first and second plunger chambers 51, 52 to the common rail 1 through the first and second fuel pressure-supply paths 62, the first and second discharge valves 61 and the high-pressure fuel supply pipe 6 are controlled with a high accuracy. Consequently, a feedback control is made so that the common rail pressure (NPC) becomes almost equal to the target fuel pressure (PFIN). Furthermore, a duty control is used in which an ON/OFF ratio (current application time ratio, duty ratio) of the control pulse signal (pulse-like pump drive signal) per unit time is adjusted in accordance with the pressure deviation (ΔP) between the actual fuel pressure (NPC) and the target fuel pressure (PFIN). Additionally, the lift quantity of the valve 25 in the suction metering valve 5 and the area of opening of the first and second fuel suction paths 23 in the suction metering valve 5 are changed. With such a duty control, it becomes possible to effect a highly accurate digital control. Consequently, it is possible to improve the control response and follow-up performance of the actual fuel pressure (NPC) relative to the target fuel pressure (PFIN).

As described above, in the fuel injection system for an internal combustion engine, a pump pressure-supply quantity in a pump pressure-supply period in which at least one of the two pressure-supply systems #1 and #2 supplies fuel under pressure, i.e., a pump discharge quantity in 360° CA period for each of the two pressure-supply systems #1 and #2, is calculated. The system detects pump pressure-supply shortage or surplus in at lest one pressure-supply system in the supply pump 4 used for the common rail type fuel injection system of this embodiment, as shown in the flowchart of FIG. 6. The pressure-supply shortage or surplus is then compared with the first decision value (first decision threshold ±α) given by the pressure-supply quantity in one pressure-supply system in a normal condition of the supply pump 4. Finally, a check is made to see if a pump failure such as a pump pressure-supply shortage failure of a pump pressure-supply surplus failure is occurring or not in at least one of the two pressure-supply systems #1 and #2.

Figure 12A:
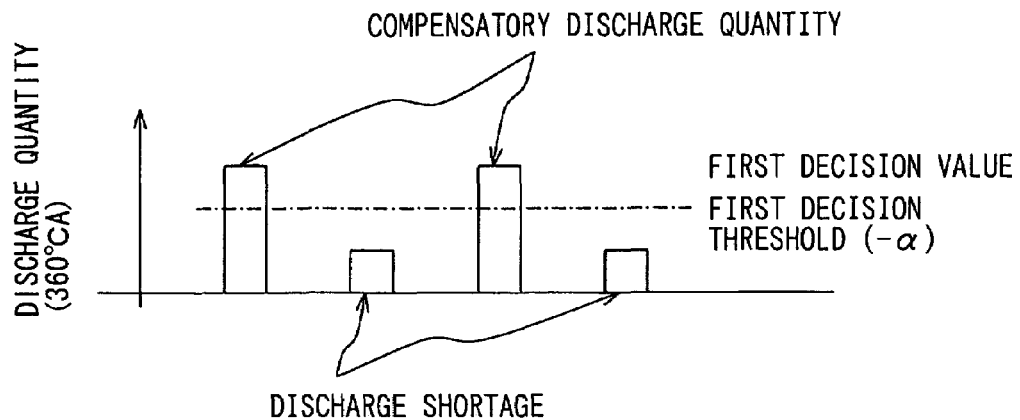
FIGS. 12A–12C are graphical diagrams of operational details of the pump troubleshooting process of the first embodiment of the present invention.
Figure 12B:
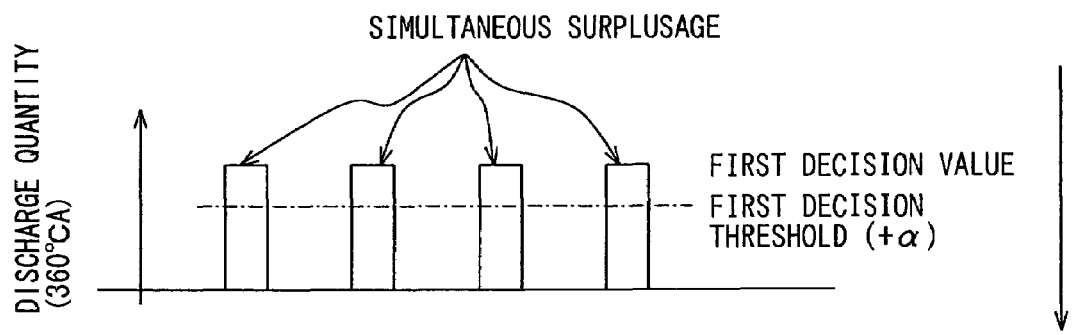
Figure 12C:
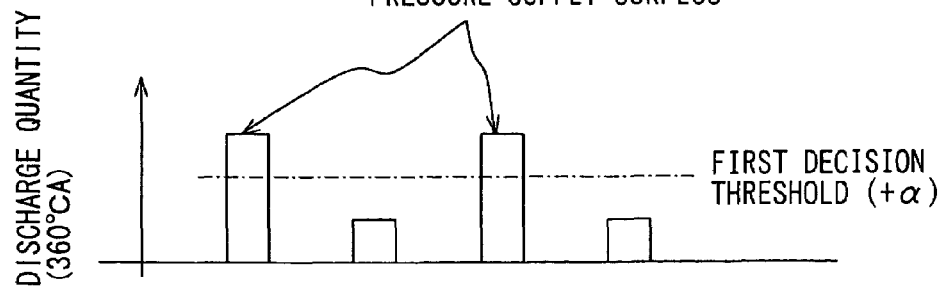

When the pump discharge quantity in 360° CA period is smaller than the first decision value (first decision threshold −α) in at least only one of the two pressure-supply systems #1 and #2, i.e., in only a specific pressure-supply system, in the supply pump 4, it is possible to highly accurately determine that a pump pressure-supply shortage failure (HUSOKU1) is occurring in the pressure-supply system concerned, as shown in FIG. 12A. When the pump discharge quantity in 360° CA period is larger than the first decision value (first decision threshold +α) in only at least one of the two pressure-supply systems #1 and #2, i.e., in only a specific pressure-supply system, in the supply pump 4, it is possible to highly accurately determine that a pump pressure-supply surplus failure (KAJO1) is occurring in the pressure-supply system concerned, as shown in FIGS. 12B and 12C.

Thus, the occurrence of a pump failure (FAIL1) such as a pump pressure-supply surplus failure or a pump pressure-supply shortage failure for each of the two pump pressure-supply systems #1 and #2 in the supply pump 4 can be checked with high precision without performing any special operation for detecting the pump failure. It is therefore possible to prevent a lowering of the fuel pressure (common rail pressure) within the common rail 1. Consequently, during the diagnosis of a pump failure (FAIL 1) such as a pump pressure-supply surplus failure or a pump pressure-supply shortage failure, it is possible to prevent the injection of fuel to the engine from becoming unstable or prevent engine stall (e.g., prevent an excessive lowering of the common rail pressure and consequent inability of the injectors 2 to inject fuel into the cylinders of the engine or prevent the fuel injection quantity from becoming smaller than a satisfactory engine operation level).

A pump pressure-supply defect may occur not only due to the aforesaid pump failure (FAIL1) such as a pump pressure-supply shortage failure (HUSOKU1) but also due to the suction of a large amount of air together with fuel into the supply pump 4 from the fuel tank 9 upon a swing motion of the liquid fuel level in the fuel tank 9 caused by, for example, turning of the vehicle when the residual fuel quantity in the fuel tank is near the low level (before a complete shortage of fuel). It is also likely that pump pressure-supply shortage or surplus may occur upon the occurrence of a slide defect of the slide portion or an operation defect of the movable portion in each of the two pressure-supply systems (first and second pump elements).

In this embodiment, whether a pump control defect (KAJO2 or HUSOKU2) caused by the incorporation of a large amount of air into the cylinder of any of the two pressure-supply systems #1 and #2 in the supply pump 4 before a complete shortage of fuel or a pump control defect caused by a slide defect of the slide portion or an operation defect of the movable portion is occurring or not is determined. This is determined by calculating a pump pressure-supply quantity in a pump pressure-supply period in which at least one of the two pressure-supply systems #1 and #2 supplies fuel under pressure, i.e., a pump discharge quantity in 360° CA period for each of the two pressure-supply systems #1 and #2. Then, the thus-calculated pump discharge quantity is compared with the second decision value (second threshold ±α), which is given by the pressure-supply quantity in one pressure-supply system in normal condition of the supply pump 4, as in the flowchart of FIG. 7 showing the details of the pump discharge quantity troubleshooting.

For distinguishing between a pump pressure-supply shortage caused by a pump failure of the supply pump 4 and a pump pressure-supply shortage caused by a complete shortage of fuel, a pump discharge quantity in 360° CA period is calculated for each pressure-supply system in the supply pump 4. When the pump discharge quantity is smaller than the first and second decision values (first and second decision thresholds −α) in all the pressure-supply systems, this state is regarded as a complete shortage of fuel in which the residual fuel quantity in the fuel tank 9 is not larger than a predetermined value and is not determined to be a pump failure (FAIL1) or a pump control failure (FAIL2). In this embodiment, the first and second decision values are set in such a manner that the second decision value (second decision threshold ±α) is smaller than the first decision value (first decision threshold ±α), that is, in such a manner that the second decision value becomes a value close to a normal value. However, there may be adopted a method wherein the second decision value is made (second decision threshold ±β), the first and second decision threshold values are made equal to each other and the first and second decision values are set so that (second decision threshold ±β) assumes a smaller value than (first decision threshold ±α), that is, assumes a value closer to a normal value.

Figure 13D:
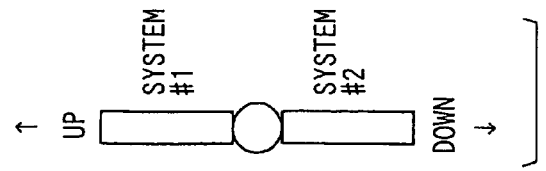
FIG. 13D is a schematic diagram of installed positions of the two pressure-supply systems of FIGS. 13A to 13C.
Figure 13D:
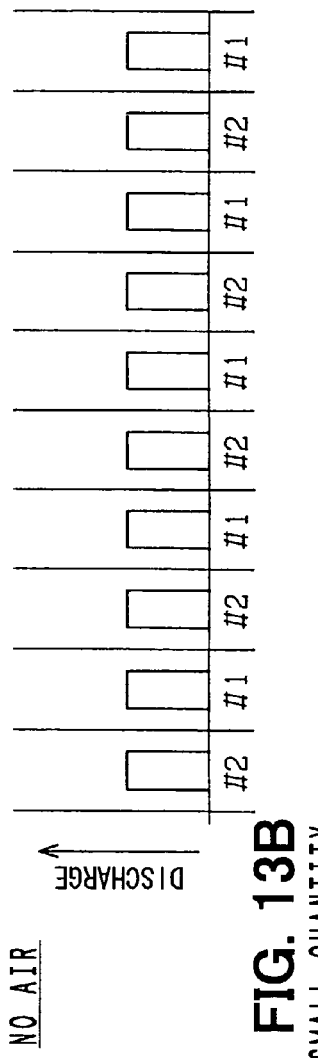
Figure 13D:
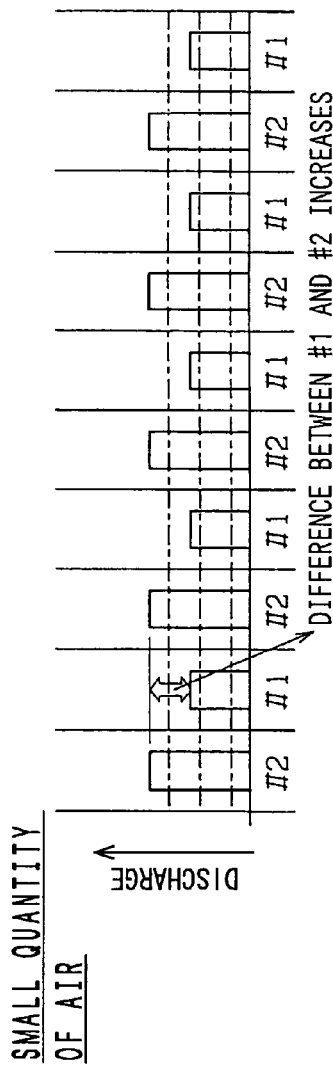
Figure 13D:
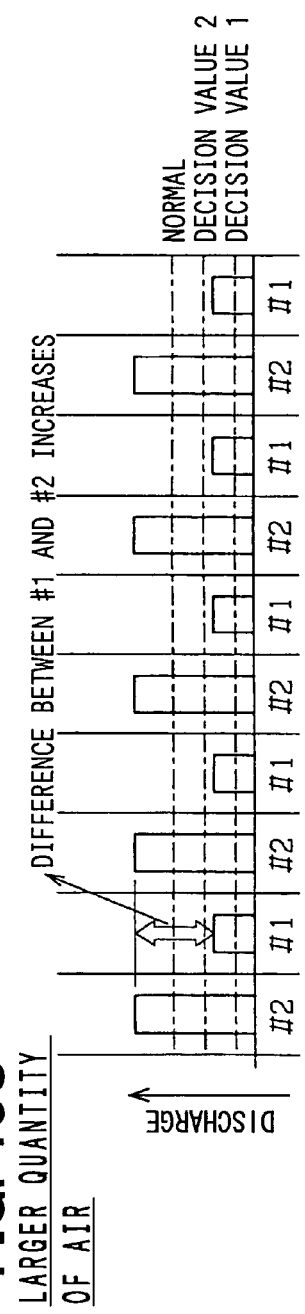

FIGS. 13A to 13C show pump pressure-supply shortage caused by the incorporation of air into the cylinder of the first pressure-supply system #1 in the case of the supply pump 4 provided with two pressure-supply systems #1 and #2 (first and second pump elements). In FIG. 13B, a small amount of air is incorporated into the cylinder of the pressure-supply system #1 and for compensating a pump discharge quantity, which is deficient relative to that in normal condition, there is a difference between the pump discharge quantity in the pressure-supply system #1 and that in the pressure-supply system #2. In FIG. 13C, a large amount of air is incorporated into the cylinder of the pressure-supply system #1, and for compensating a pump discharge quantity which is deficient relative to that in normal condition, a difference in pressure-supply quantity between the pump discharge quantity in the pressure-supply system #1 and that in the pressure-supply system #2 is larger than that in FIG. 13B.

When a small amount of air sucked in with fuel from the fuel tank 9 enters the cylinder of the pressure-supply system #1 (the first cylinder head 33 of the first pump element), positioned upward in the drawing, there occurs a difference between the pump discharge quantity in the pressure-supply system #1 and that in the pressure-supply system #2 for compensating a pump pressure-supply quantity, which is deficient relative to that in normal condition. When a large amount of air has been sucked in together with fuel from the fuel tank 9 enters the cylinder of the pressure-supply system #1 (the first cylinder head 33 of the first pump element) positioned upward in the drawing, the pump discharge quantity in the pressure-supply system #1 becomes deficient to a large extent relative to the pump discharge quantity in the pressure-supply system #2 for compensating a pump pressure-supply quantity which is deficient relative to that in normal condition.

When air is mixed into the cylinder of the pressure-supply system #1 (the first cylinder head 33 of the first pump element), positioned upward in the drawing, the air stays in the first fuel suction path 23 in the first cylinder head 33 and is difficult to be discharged to the exterior. Even when air is mixed into the cylinder of the pressure-supply system #2 (the second cylinder head 34 of the second pump element), positioned downward in the drawing, the air does not stay in the second fuel suction path 23 in the second cylinder head 34 and can be discharged to the exterior easily. Thus, by providing the second decision value (second decision threshold −α) smaller than the first decision value (first decision threshold −α) for pump pressure-supply shortage which is caused by a pump failure, it is possible to distinguish between a pump failure (FAIL1) caused by a pump pressure-supply shortage failure (HUSOKU1) and a pump control defect (FAIL2) such as pump pressure-supply shortage (HUSOKU2) caused by the incorporation of a large amount of air into the cylinder of the pressure-supply system #1 before a complete shortage of fuel. Besides, pump pressure-supply shortage (HUSOKU2) caused by the incorporation of a large amount of air into the cylinder of the pressure-supply system #1 for example before a complete shortage of fuel can be detected easily.

When it is determined that a pump failure (FAIL1) such as a pump pressure-supply shortage failure (HUSOKU1) or a pump pressure-supply surplus failure (KAJO1) is occurring in one or more pressure-supply systems in the supply pump 4, the upon-trouble-detection processing of FIGS. 8 and 9 is executed to limit the accelerator position (ACCP) to a predetermined position (e.g., 10%) or less and limit the target injection quantity (Q) to a predetermined value (e.g., 15 mm³/st) or less. With this, the engine speed (NE) and the target common rail pressure (PFIN) can be limited to predetermined values or less.

Accordingly, it is possible to lighten an excessive burden on the normal pressure-supply system in the supply pump 4. As a result, it is possible to prevent wear and seizure of the cam ring 45 and tappets (e.g., the first and second plate members 46, 47) interposed between the first and second plungers 41, 42 and the eccentric cam 44 in the normal pressure-supply system. For preventing wear and seizure of the cam ring 45 and the tappets it has experimentally been found necessary that the fuel injection quantity (target injection quantity: Q) and the engine speed (NE) be limited to predetermined values or less and that the number of revolutions of the supply pump 4 be decreased in addition to decreasing the surface pressure by limiting the target fuel pressure (PFIN) to a predetermined value (e.g., 50 MPa) or less. Thus, it is desirable that the target fuel pressure (PFIN) be surely included in the limitation quantity and at least one of the fuel injection quantity (target injection quantity: Q) and the engine speed (NE) be also included therein.

When it is determined that a pump control defect (FAIL2) such as pump pressure-supply shortage (HUSOKU2) caused by the incorporation of a large amount of air into the cylinder of one or more pressure-supply systems in the supply pump 4 before a complete shortage of fuel or caused by a slide defect of the slide portion or pump pressure-supply surplus (KAJO2) caused by an operation defect of the movable portion is occurring, the upon-trouble-detection processing of FIG. 9 is executed to limit the target fuel pressure (PFIN) to a predetermined value (e.g., 100 MPa) or less. With this arrangement, an abnormally high-pressure condition of the high-pressure fuel portion in the common rail type fuel injection system can be avoided. As a result, it is possible to avoid an inconvenience such as the common rail pressure (NPC) exceeding the valve opening pressure of the pressure limiter 8 installed in the common rail 1 and causing the pressure limiter 8 to open. Thus, a lowering of the engine output and the deterioration (lowering) in the valve opening pressure of the pressure limiter 8, which are caused by a lowering of the common rail pressure caused by valve opening in the pressure limiter 8 and consequent obstruction of a satisfactory fuel injection, is not likely to occur.

In the common rail type fuel injection system of this embodiment, when it is determined that a pump control defect (FAIL 2) such as pump pressure-supply shortage (HUSOKU2) caused, for example, by the incorporation of a large amount of air into the cylinder(s) of one or more pressure-supply systems in the supply pump 4 is occurring, updating of the integral compensation quantity (integral update quantity: DI) used in calculating the feedback correction quantity is stopped and the last-time integral term (FBI) is held (integral term holder) Thus, a greater rise than necessary of the common rail pressure, e.g., a fuel pressure overshoot phenomenon in which the actual fuel pressure (NPC) becomes higher than the target fuel pressure (PFIN), can be prevented. The greater rise than necessary of the common rail pressure is attributable to an excessive learning of the integral compensation quantity upon the occurrence of a pump control defect (FAIL2) such as a pump pressure-supply shortage (HUSOKU2) caused, for example, by the incorporation of a large amount of air into the cylinder(s) of one or more pressure-supply systems in the supply pump 4 before a complete shortage of fuel. Consequently, it is possible to prevent deterioration of the common rail pressure controlling performance. Furthermore, since it is possible to prevent deterioration of the pressure-resistant structure of the fuel pipe line in the common rail type fuel injection system, it is possible to prevent leakage of the fuel from the common rail 1, injectors 2, and supply pump 4 to the exterior and, hence, possible to improve the reliability of each product.

Figure 14:
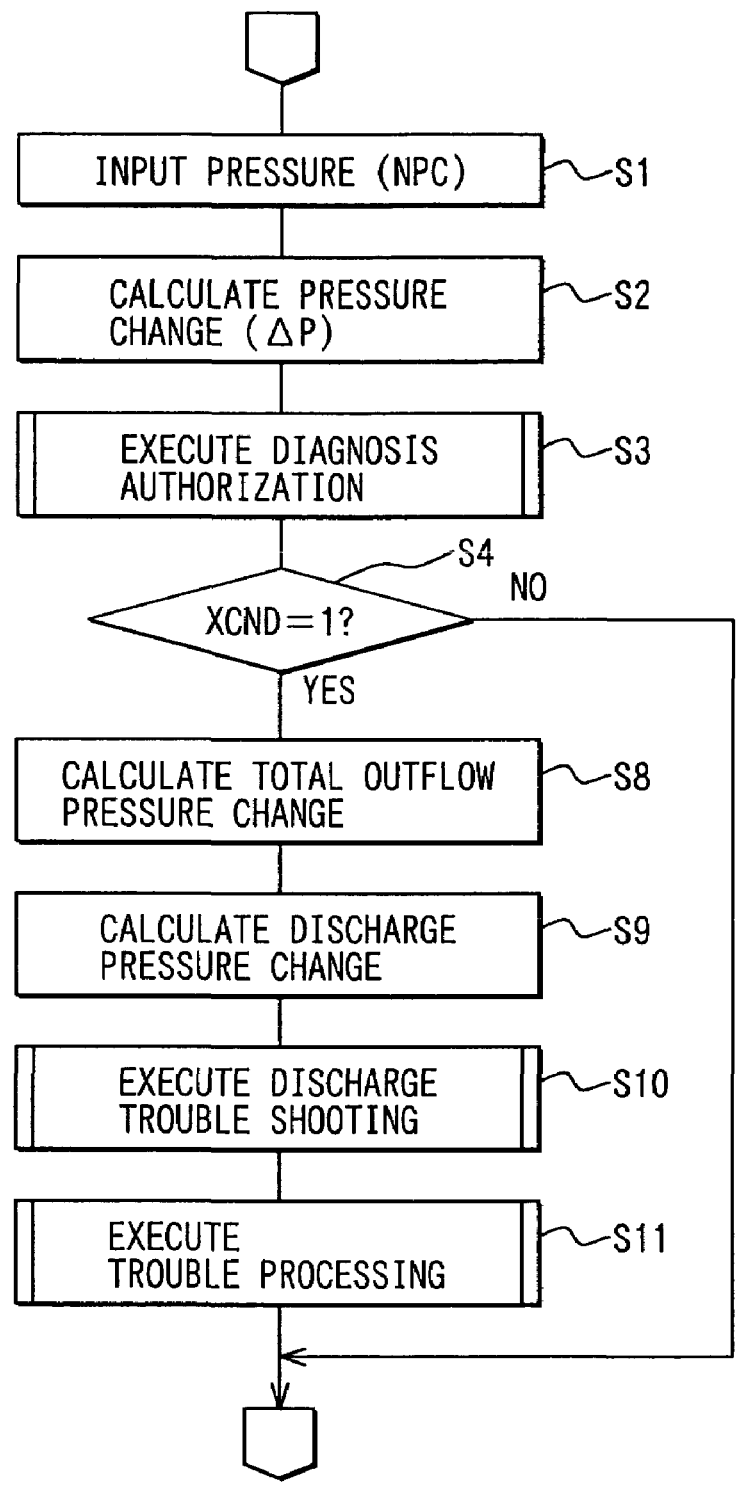
FIG. 14 is a flowchart of a pump discharge quantity troubleshooting process in accordance with a second embodiment of the present invention.

FIG. 14 is a flowchart showing a pump discharge quantity troubleshooting method of a second embodiment of the present invention. In FIG. 14, the same control processings as in the main routine of FIG. 4 are identified by the same reference numerals and, therefore, explanations thereof will be omitted.

When the answer in Step S4 is affirmative, i.e., XCND=1, a common rail pressure change in 360° CA period corresponding to the total outflow quantity of fuel flowing out from the plurality of injectors 2 is calculated in a pump pressure-supply period in which at least one of the plurality of pressure-supply systems supplies fuel under pressure. More specifically, the total outflow quantity is multiplied by the bulk modulus E, then the value obtained is divided by the total volume V of the high-pressure fuel portion and the resulting value is assumed to be a common rail pressure change in 360° CA period corresponding to the total outflow quantity (Step S8). Next, a common rail pressure change corresponding to the pump discharge quantity in 360° CA period is calculated. More specifically, a value obtained by subtracting the common rail pressure change in 360° CA period from the total outflow quantity equivalent pressure change is assumed to be a pressure change in 360° CA period corresponding to the pump discharge quantity in 360° CA period (Step S9).

Next, in Step S10, the pressure change in 360° CA period corresponding to the pump discharge quantity in 360° CA period is compared with a first decision value (first decision threshold $\pm\alpha$). The first decision value is calculated from the pump pressure-supply quantity per fuel pressure-supply system in case of the supply pump 4 being in normal condition. When a pump pressure-supply surplus or shortage occurs in only a specific pressure-supply system, there is detected a pump failure such as a pump pressure-supply surplus or shortage in the pressure-supply system concerned. Furthermore, the pressure change in 360° CA period corresponding to the pump discharge quantity in 360° CA period is compared with a second decision value (second decision threshold $\pm\alpha$). The second decision value is calculated from the pump pressure-supply quantity per fuel pressure-supply system in case of the supply pump 4 being in normal condition. When a pump pressure-supply surplus or shortage occurs in only a specific pressure system, there is detected a pump control defect caused by the incorporation of a large amount of air into the cylinder of the pressure-supply system concerned before a complete shortage of fuel or such as a slide defect of the slide portion or an operation defect of the movable portion. As in the first embodiment, when the pump pressure-supply quantity in 360° CA period is short in all the pressure-supply systems, this state is regarded as a complete shortage of fuel in which the residual fuel quantity in the fuel tank 9 is not larger than a predetermined quantity, and is excluded from the troubleshooting.

As to the pump pressure-supply surplus failure, in the case of a supply pump of the type in which the pump discharge quantity is controlled by an electromagnetic control valve provided for each pressure-supply system, an excessive pressure-supply quantity of the pump in 360° CA period in only a specific pressure-supply system can be detected by sticking of one or more electromagnetic valves which are each for metering the pump pressure-supply quantity for each pressure-supply system. In the case of such a supply pump 4, as in this embodiment wherein the pump pressure-supply quantity in all the pressure-supply systems is controlled with one suction metering valve 5, a pump pressure-supply surplus failure may occur simultaneously in all the pressure-supply systems by a sticking of the valve 25 of one suction metering valve 5, which is for metering the pump pressure-supply quantity in all the pressure-supply systems. Therefore, when the pump pressure-supply quantity in 360° CA period is surplus in all the pressure-supply systems, it is detected that all the pressure-supply systems are surplus in the pressure-supply quantity (a pump pressure-supply surplus failure).

Figure 15:
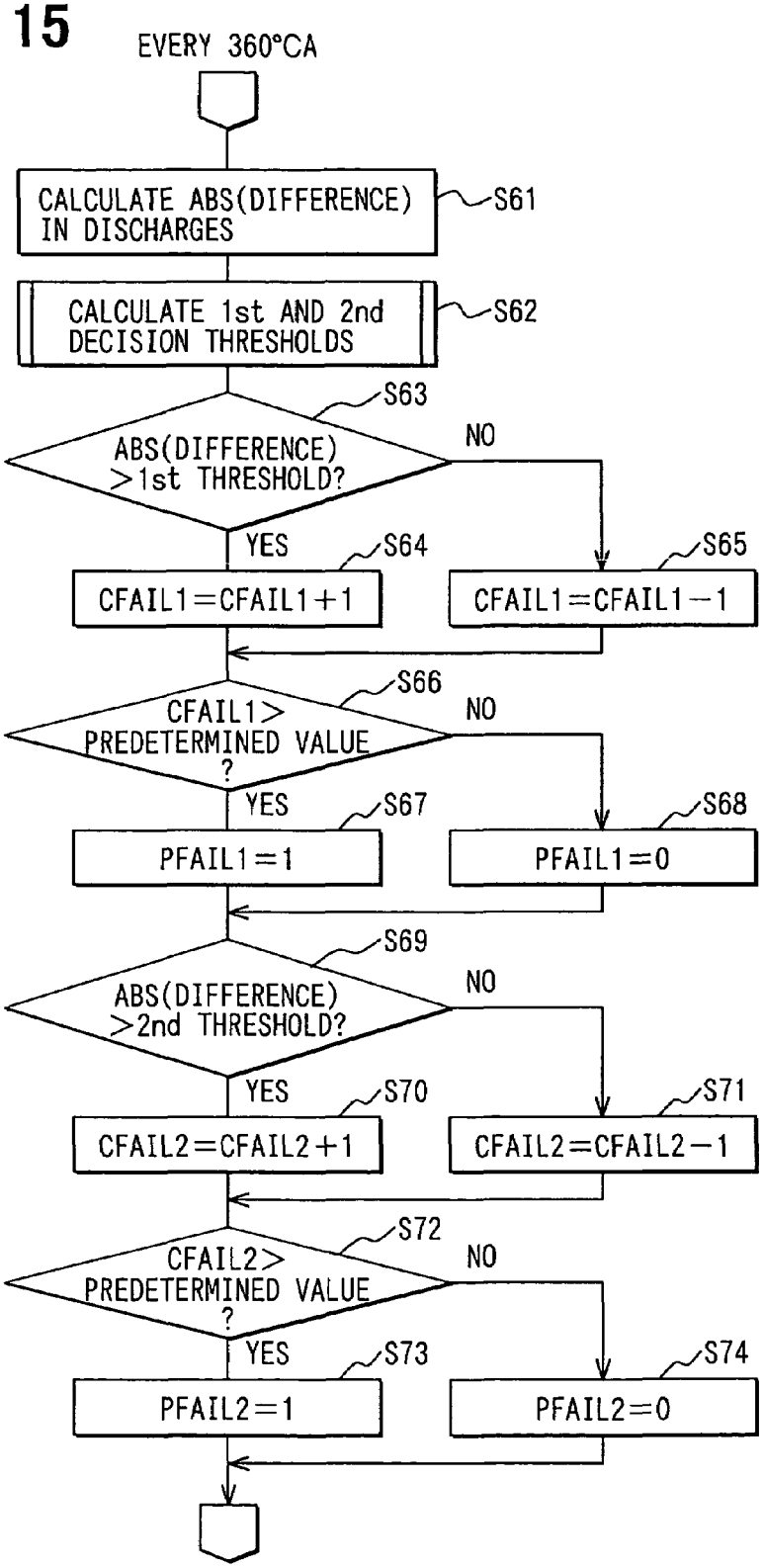
FIG. 15 is a flowchart of a pump discharge quantity troubleshooting process in accordance with a third embodiment of the present invention.
Figure 16A:
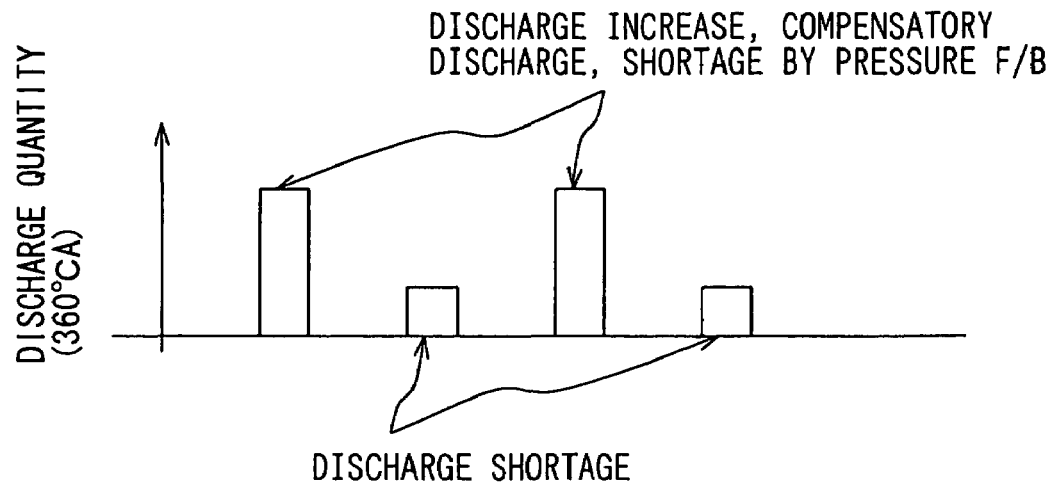
FIGS. 16A and 16B are graphical diagrams of operational characteristics of the pump discharge quantity troubleshooting process of FIG. 15.
Figure 16B:
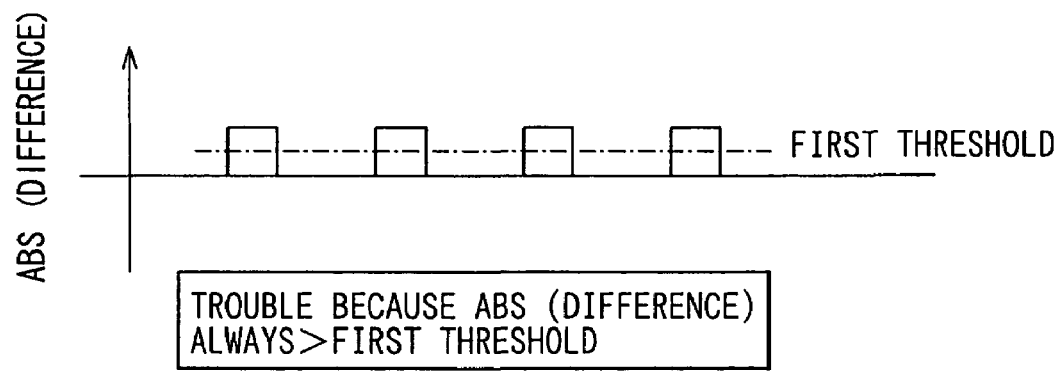

FIGS. 15 and 16 illustrate a third embodiment of the present invention. FIG. 15 is a flowchart showing the details of the pump discharge quantity troubleshooting of Step S10 in the main routine of FIG. 14.

First, an absolute value of a difference between a last-time pump discharge quantity and a this-time pump discharge quantity is calculated. More specifically, an absolute value of a difference between the pump discharge quantity in 360° CA period in a specific pressure-supply system before 360° CA and the pump discharge quantity in 360° CA period in the specific pressure-supply system after 360° CA is calculated. Or, in case of calculating an absolute value with respect to the pump 2 in FIG. 3, an absolute value of a difference between the pump discharge quantity in 360° CA period of the pump 1 and the pump discharge quantity in 360° CA period of the pump 2 is calculated (Step S61).

Next, first and second decision values (first and second decision thresholds) are calculated based on the pump pressure-supply quantity per fuel pressure-supply system in normal condition of the supply pump 4 (Step S62). In this case, there may be adopted a method wherein a pump discharge quantity per pressure-supply system in normal condition of all the pressure-supply systems in the supply pump 4 is calculated based on a drive current value for the electromagnetic valve such as, for example, the suction metering valve (SCV) 5 and the engine speed (NE) and first and second decision values (first and second decision thresholds) are calculated based on the thus-calculated pump discharge quantity. The second decision value (second decision threshold) is set smaller, i.e., closer to a normal value, than the first decision value (first threshold value).

Then, it is determined whether the absolute value of the difference between the last-time pump discharge quantity and the this-time pump discharge quantity is larger than the first decision threshold or not (Step S63). When the answer in Step S63 is affirmative, a failure monitor counter (CFAIL1) is incremented (Step S64). Thereafter, the processing flow advances to Step S66.

When the answer in Step S63 is negative, the failure monitor counter (CFAIL1) is decremented (Step S65). Next, it is determined whether the count value of the failure monitor counter (CFAIL1) is larger than a predetermined value or not (Step S66). When the answer in Step S66 is affirmative, it is determined that a pump pressure-supply shortage failure or a pump pressure-supply surplus failure is occurring in a specific pressure-supply system and the Failure Decision Flag (PFAIL1) is set to one (Step S67). Thereafter, the processing flow advances to Step S69.

When the answer in Step S66 is negative, it is determined that neither a pump pressure-supply shortage failure nor a pump pressure-supply surplus failure is occurring in any specific pressure-supply system and the Failure Decision Flag (PFAIL1) is set to zero (Step S68). Thereafter, the processing flow advances to a determination processing of Step S69. Next, it is determined whether the absolute value of the difference between the last-time pump discharge quantity and the this-time pump discharge quantity is larger than the second decision threshold or not (Step S69). When the answer in Step S69 is affirmative, a control defect monitor counter (CFAIL2) is incremented (Step S70). Thereafter, the processing flow advances to a determination processing of Step S72.

When the answer in Step S69 is negative, the control defect monitor counter (CFAIL2) is decremented (Step S71). Next, it is determined whether the count value of the control defect monitor counter (CFAIL2) is larger than a predetermined value or not (Step S72). On the other hand, when the answer in Step S69 is affirmative, it is determined that the incorporation of a large amount of air into the cylinder before a complete shortage of fuel or a slide defect of the slide portion or an operation defect of the movable portion is occurring in a specific pressure-supply system and the Control Defect Flag (PFAIL2) is set to one (Step S73). Thereafter, the processing flow leaves the routine of FIG. 15.

When the answer in Step S72 is negative, it is determined that neither a pump pressure-supply shortage failure nor a pump pressure-supply surplus failure is occurring in any specific pressure-supply system and the Control Defect Flag (PFAIL2) is reset to zero (Step S74). Thereafter, the processing flow leaves the routine of FIG. 15.

The pump discharge quantity troubleshooting in this embodiment will now be described briefly with reference to FIG. 16. As can be seen also from the graph of FIG. 16, when a pump pressure-supply shortage failure or a pump pressure-supply surplus failure occurs in a specific pressure-supply system, and the case of such a supply pump 4 as in this embodiment which pump is provided with two pressure-supply systems, the discharge quantity in a normal pressure-supply system increases for compensating the discharge shortage of a defective pressure-supply system by feedback-controlling the common rail pressure. Furthermore, in the troubleshooting method wherein the pump discharge quantity is calculated for each pressure-supply system and troubleshooting is performed using an absolute value of a difference between a last-time pump pressure-supply quantity and a this-time pump pressure-supply quantity, since the said absolute value is in excess of the first decision threshold, as shown in FIG. 16A, it can be determined that a pump pressure-supply shortage failure or a pump pressure-supply surplus failure is occurring in a specific pressure-supply system. Thus, it is possible to determine that a pump failure is occurring.

When pump pressure-supply surplus occurs in all of the pump pressure-supply systems, the pump failure may be incapable of being detected by the method wherein troubleshooting is performed using an absolute value of a difference between a last-time pump pressure-supply quantity and a this-time pump pressure-supply quantity. When pump pressure-supply shortage occurs in all the pressure-supply systems, there is the possibility of a complete shortage of fuel. However, according to the troubleshooting method in question, it is possible to avoid determining such pump pressure-supply shortage as a pump failure. That is, upon the occurrence of a complete shortage of fuel, since the pressure-supply quantity is deficient in all the pressure-supply systems, it is possible to identify the pump pressure-supply shortage caused by a complete shortage of fuel. This can be done by utilizing the fact that no difference appears between the last-time and this-time pump pressure-supply quantities. Furthermore, by using the absolute value of the difference between the last-time and this-time pressure-supply quantities, it is possible to correct an error (variations, a model identifying error) between calculation models of injector static leakage quantity and injector dynamic leakage quantity and actual products. It is therefore possible to improve the diagnostic accuracy in determining a pump failure such as pump pressure-supply shortage or pump pressure-supply surplus.

Figure 17:
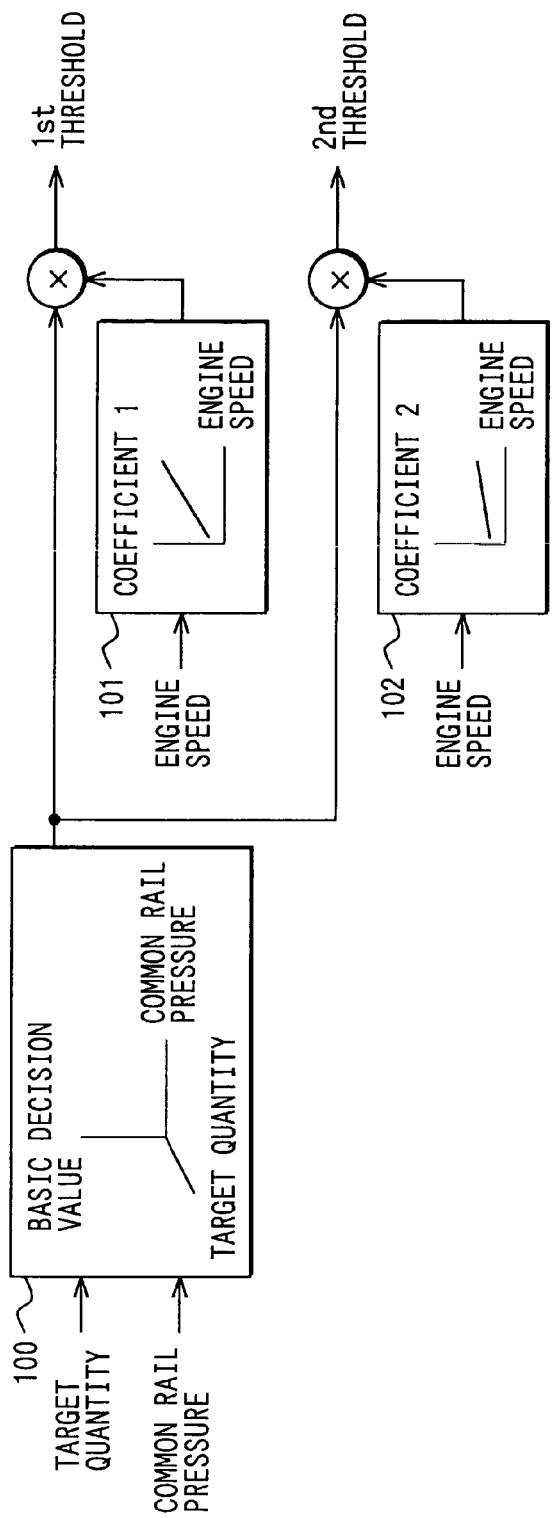
FIG. 17 is an explanatory diagram of a method of calculating first and second decision thresholds in accordance with a fourth embodiment of the present invention.

FIG. 17 illustrates a fourth embodiment of the present invention and shows a control logic for calculating first and second decision thresholds in Step S24 in the subroutine of FIG. 6 or in Step S62 in the subroutine of FIG. 15.

The ECU 10 used in this embodiment includes an injection quantity determiner, a basic decision value determiner (100), a characteristic map, a first correction coefficient determiner, and a first decision threshold determiner. The injection quantity determiner is for calculating a target injection quantity (Q) in accordance with the engine speed (NE) and the accelerator position (ACCP). The basic decision value determiner (100) is for injection quantity (Q) set by the injection quantity determiner, the common rail pressure (NPC) detected by the fuel pressure sensor 75, and a characteristic map prepared in advance by experiment and measurement. The first correction coefficient determiner (101) is for calculating a correction coefficient 1 by using the engine speed (NE), a correction coefficient 1, and a characteristic map prepared in advance by experiment and measurement. The first decision threshold determiner is for calculating the first decision threshold by multiplying the basic decision value set in the basic decision value determiner (100) by the correction coefficient 1 set in the first correction coefficient determiner (101).

The ECU 10 used in this embodiment further includes a second correction coefficient determiner (102) and a second decision threshold determiner. The second correction coefficient determiner (102) is for calculating a correction coefficient 2 by using the engine speed (NE), correction coefficient 1, and a characteristic map prepared in advance by experiment and measurement. The second decision threshold determiner is for calculating a second decision threshold by multiplying the basic decision value set in the basic decision value determiner (100) by the correction coefficient 2 set in the second correction coefficient determiner (102). The value of the correction coefficient 2 is smaller than that of the correction coefficient 1.

In this way the first and second decision values (first and second threshold values, first and second thresholds) to be determined in advance can be given by using at least the target injection quantity (Q), common rail pressure (NPC) and engine speed (NE). The first decision value (first decision threshold value, first decision threshold) to be determined in advance may be provided in terms of a pump pressure-supply quantity in 360° CA period per fuel pressure-supply system in normal condition of the supply pump 4. Furthermore, the pump pressure-supply quantity in 360° CA period per fuel pressure-supply system in normal condition of the supply pump may be corrected by the correction coefficients 1 and 2 which are provided using at least one of the target injection quantity (Q), common rail pressure (NPC), and engine speed (NE).

Figure 18:
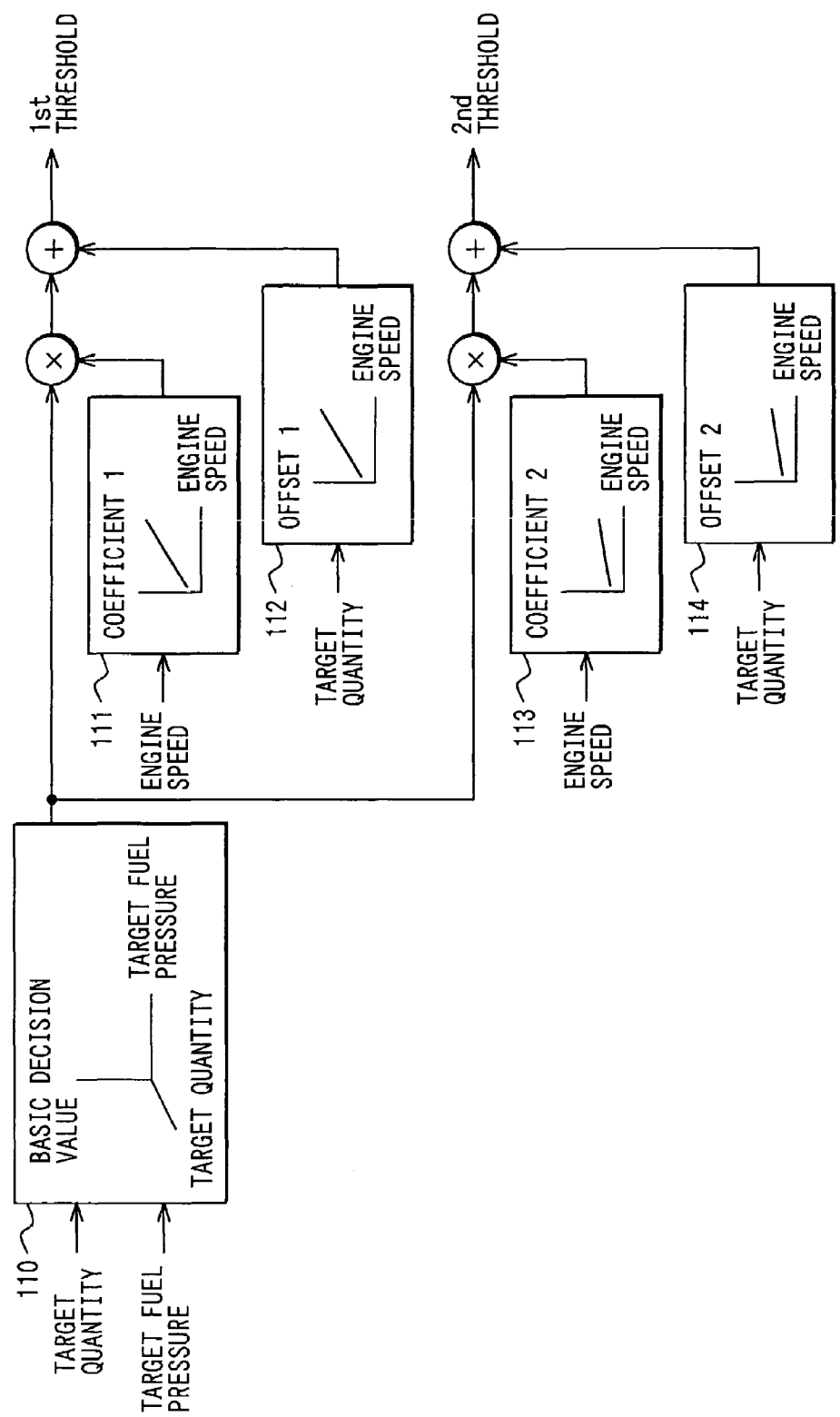
FIG. 18 is an explanatory diagram of a method of calculating first and second decision thresholds in accordance with a fifth embodiment of the present invention.

FIG. 18 illustrates a fifth embodiment of the present invention and shows a control logic for calculating first and second decision thresholds in Step S24 of the subroutine of FIG. 6 or in Step S62 of the subroutine of FIG. 15.

The ECU 10 used in this embodiment includes an injection quantity determiner, a fuel pressure determiner, a basic decision value determiner (110), a first correction coefficient determiner (111), a first offset determiner (112), and a first decision threshold determiner. The injection quantity determiner is for calculating a target injection quantity (Q) in accordance with the engine speed (NE) and the accelerator position (ACCP) The fuel pressure determiner is for calculating a target fuel pressure (PFIN) in accordance with the engine speed (NE) and the target injection quantity (Q). The basic decision value determiner (110) is for calculating a basic decision value with use of the target injection quantity (QFIN) set by the injection quantity determiner, the target fuel pressure (PFIN) set by the fuel pressure determiner, and a characteristic map prepared in advance by experiment and measurement. The first correction coefficient determiner (111) is for calculating a correction coefficient 1 by using the engine speed (NE), correction coefficient 1, and a characteristic map prepared in advance by experiment and measurement. The first offset determiner (112) is for calculating an offset 1 with use of the target injection quantity (Q) set by the injection quantity determiner, an offset value (offset 1) a characteristic map prepared in advance by experiment and measurement. The first decision threshold determiner is for calculating a first decision threshold by multiplying the basic decision value set in the basic decision value determiner (110) by the correction coefficient 1 set in the first correction coefficient determiner (111) and subsequently adding the offset 1 set in the first offset determiner (112) to the value resulting from the multiplication.

The ECU 10 used in this embodiment further includes a second correction coefficient determiner and a second decision threshold determiner (114). The second correction coefficient determiner is for calculating a correction coefficient 2 by using the engine speed (NE), correction coefficient 2 and a characteristic map prepared in advance by experiment and measurement, a second offset determiner (114) for calculating an offset 2 with use of the target injection quantity (Q) set by the injection quantity determiner, an offset value (offset 2) and a characteristic map prepared in advance by experiment and measurement. The second decision threshold determiner (114) is for calculating a second decision threshold by multiplying the basic decision value set in the basic decision value determiner (110) by the correction coefficient 2 set in the second correction coefficient determiner (113) and subsequently adding the offset 2 set in the second offset determiner (114) to the value resulting from the multiplication. The value of the correction coefficient 2 is smaller than the value of the correction coefficient 1 and the value of the offset 2 is smaller than the value of the offset 1.

In this way, as in the fourth embodiment, the first and second decision values (first and second decision threshold values, first and second decision thresholds) to be determined in advance can be provided by using at least the target injection quantity (Q), the target fuel pressure (PFIN), and the engine speed (NE). The first decision value (first decision threshold value, first decision threshold) to be determined in advance may be provided in terms of a pump pressure-supply quantity in 360° period per fuel pressure-supply system in normal condition of the supply pump 4.

Furthermore, the pump pressure-supply quantity in 360° period per fuel pressure-supply system in normal condition of the supply pump 4 may be corrected by offsets 1 and 2 or correction coefficients 1 and 2, which are given using at least one of the target injection quantity (Q), common rail pressure (NPC), and engine speed (NE).

Figure 19:
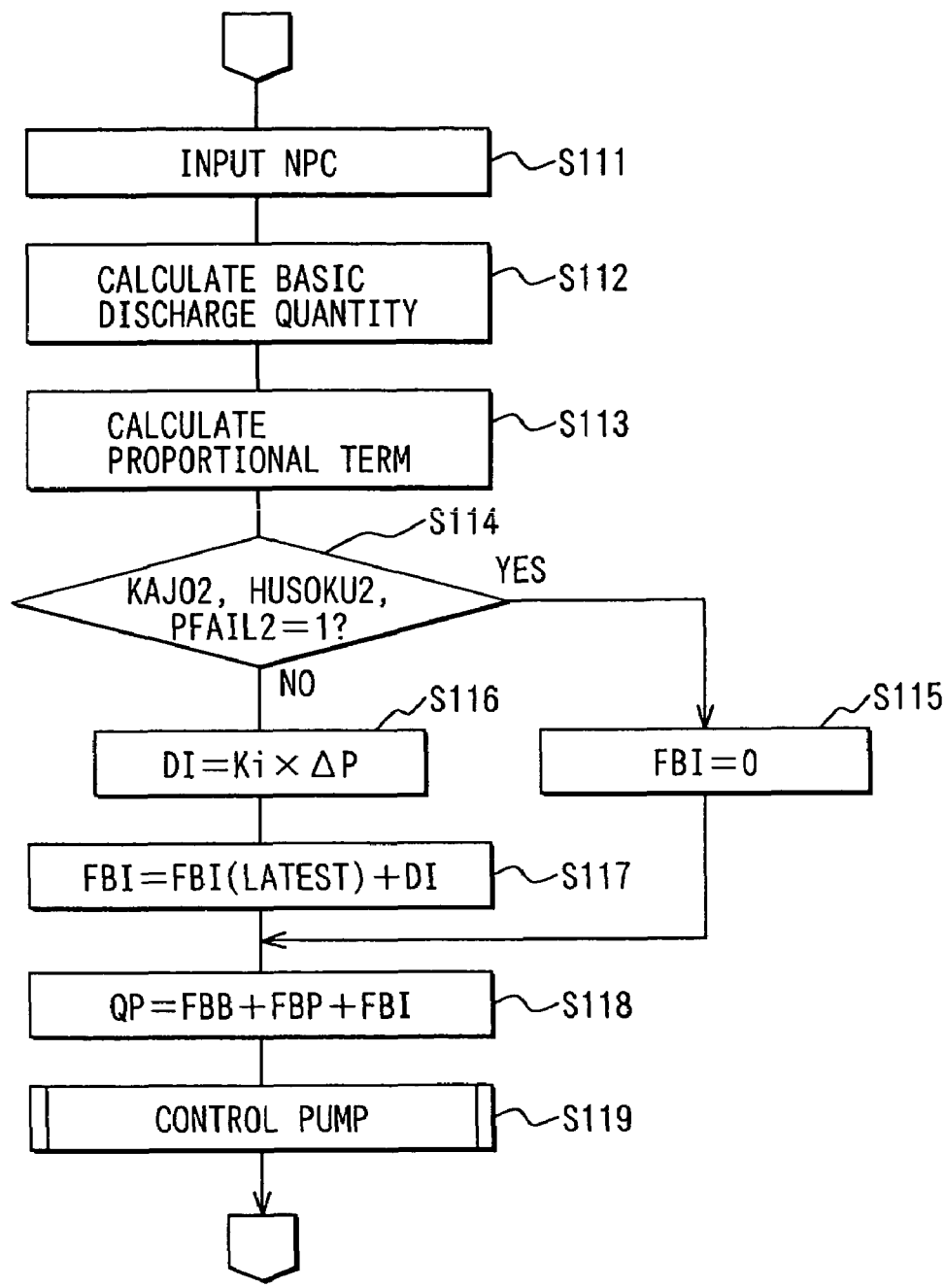
FIG. 19 is a flowchart of a fuel pressure control process in accordance with a sixth embodiment of the present invention.

FIG. 19, which illustrates a sixth embodiment of the present invention, is a flowchart showing the details of the pump control (normal pressure FB control, fuel pressure control) processing of Step S59 of the subroutine of FIG. 9.

The subroutine of FIG. 19 is executed at every predetermined control timing (e.g., 360° CA) after turning ON (IG, ON) the ignition switch. First, the common rail pressure (NPC) detected by the fuel pressure sensor 75 is inputted (Step S111). Then, the target injection quantity (Q) is inputted and a command injection quantity (QFIN) is calculated. This is accomplished by adding to the target injection quantity (Q) an injection correction quantity which takes the engine cooling water temperature (THW) and the fuel temperature (THF) into account (injection quantity determiner). Subsequently, a target fuel pressure (PFIN) is calculated by using the engine speed (NE), the command injection quantity (QFIN), and a characteristic map prepared in advance by experiment and measurement (fuel pressure determiner).

Then, a basic discharge quantity (basic control quantity: FBB) of the supply pump 4 is calculated from the command injection quantity (QFIN) and the target fuel pressure (PFIN) with the use of a map or an arithmetic expression (basic control quantity determiner: Step S112). Next, a pressure deviation (ΔP=PFIN−NPC) between the target fuel pressure (PFIN) and the common rail pressure (NPC) is calculated (pressure deviation calculator).

Subsequently, a proportional gain (Kp) is multiplied by the pressure deviation (ΔP) to calculate a this-time proportional term (FBP) which is used in calculating a feedback correction quantity (proportional term calculator: Step S113).

Next, it is determined whether a pump control defect (FAIL2) such as a pump pressure-supply shortage (HUSOKU2) caused by the incorporation of a large amount of air into the cylinder(s) of one or more pressure-supply systems in the supply pump 4 or caused by a slide defect of the slide portion or pump pressure-supply surplus (KAJO2) caused by an operation defect of the movable portion is occurring or not. That is, it is determined whether at least one of KAJO2 (surplus counter) in the subroutine of FIG. 7, HUSOKU2 (shortage counter) in the subroutine of FIG. 7, and the Control Defect Flag (PFAIL2) in the subroutine of FIG. 15, is in a state of being set to one or not (Step S114). When the answer in Step S114 is affirmative, the integral compensation quantity (integral update quantity: DI), which is updated in accordance with the pressure deviation (ΔP) between the target fuel pressure (PFIN) and the common rail pressure (NPC), as well as the last time integral term (FBI: last-time value), are cleared and this-time integral term is cleared (FBI=0) (integral term clearing means: Step S115). Thereafter, the processing flow advances to a pump discharge quantity calculating process of Step S118.

When the answer in Step S114 is negative, the integral gain (Ki) is multiplied by the pressure deviation (ΔP) between the target fuel pressure (PFIN) and the common rail pressure (NPC) to update the integral compensation quantity (integral update quantity: DI) (Step S116). Next, a this-time integral term (FBI) is calculated by adding the integral compensation quantity (integral update quantity: DI) and the last-time integral term (last-time value: FBI) stored in memory such as EEPROM (integral term calculator: Step S117). The this-time integral term (FBI) thus calculated is stored as a last-time integral term (FBI: last-time value) in memory such as EEPROM.

Then, when a pump control defect (FAIL2) is not occurring, the this-time proportional term (FBP) and the this-time integral term (FBI) are added together to calculate a feedback correction quantity for the basic discharge quantity (FBB) of the supply pump 4. On the other hand, when a pump control defect (FAIL2) is occurring, the this-time proportional term (FBP) and the this-time feedback correction quantity for the basic discharge quantity (FBB) of the supply pump 4. That is, the this-time proportional term (FBP) is made a feedback correction quantity (correction quantity calculator). Subsequently, the basic discharge quantity (FBB) of the supply pump 4 and the feedback correction quantity are added together to calculate a pump command discharge quantity (control command value: QP) (Step S118). The feedback correction quantity may be calculated directly as a pump command discharge quantity (QP) by adding the basic discharge quantity (FBB) of the supply pump 4, the this-time proportional term (FBP), and the this-time integral term (FBI). Next, the suction metering valve 5 in the supply pump 4 is controlled (Step S119). As in the first embodiment, this control is made by converting the pump command discharge quantity (QP) to a target drive current value (command drive current value: IBP) with use of a predetermined conversion coefficient.

Thus, in the common rail type fuel injection system of this embodiment, when it is determined that a pump control defect (FAIL2) such as a pump pressure-supply shortage (HUSOKU2) caused, for example, by the incorporation of a large amount of air into the cylinder(s) of one or more pressure-supply systems in the supply pump 4 is occurring, the integral compensation quantity (integral update quantity: FBI) used in calculating the pump command discharge quantity (QP) is cleared and the last-time integral term (FBI) is held (integral term holder). By so doing, it is possible to prevent a greater rise of the common rail pressure than necessary, e.g., a fuel pressure overshoot phenomenon in which the actual fuel pressure (NPC) becomes higher than the target fuel pressure (PFIN). This greater rise of the common rail pressure is caused by an excessive learning of the integral compensation quantity upon occurrence of a pump control defect (FAIL2) such as pump pressure-supply shortage (HUSOKU2) attributable to the incorporation of a large amount of air into the cylinder of one or more pressure-supply systems in the supply pump 4 before a complete shortage of fuel. Consequently, it is possible to prevent deterioration of the common rail pressure controlling performance. Besides, since it is possible to prevent deterioration of the pressure-resistant structure of the fuel pipe line in the common rail fuel injection system, it is possible to prevent the leakage of fuel to the exterior from the common rail 1, injectors 2, and supply pump 4 and hence possible to improve the reliability of each product.

Figure 20:
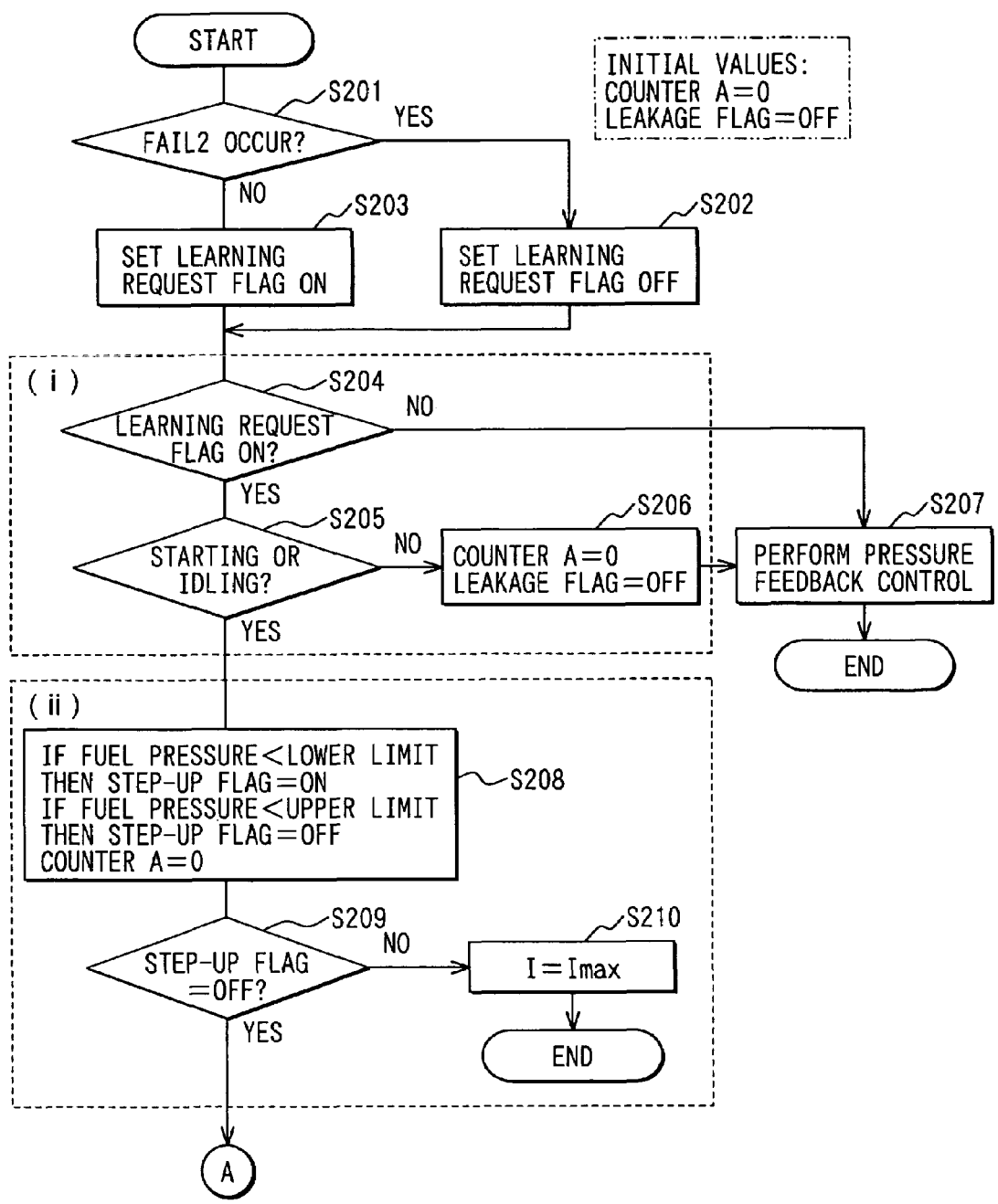
FIGS. 20–21 present a flowchart of a pump machine difference learning control process of a seventh embodiment of the present invention.
Figure 21:
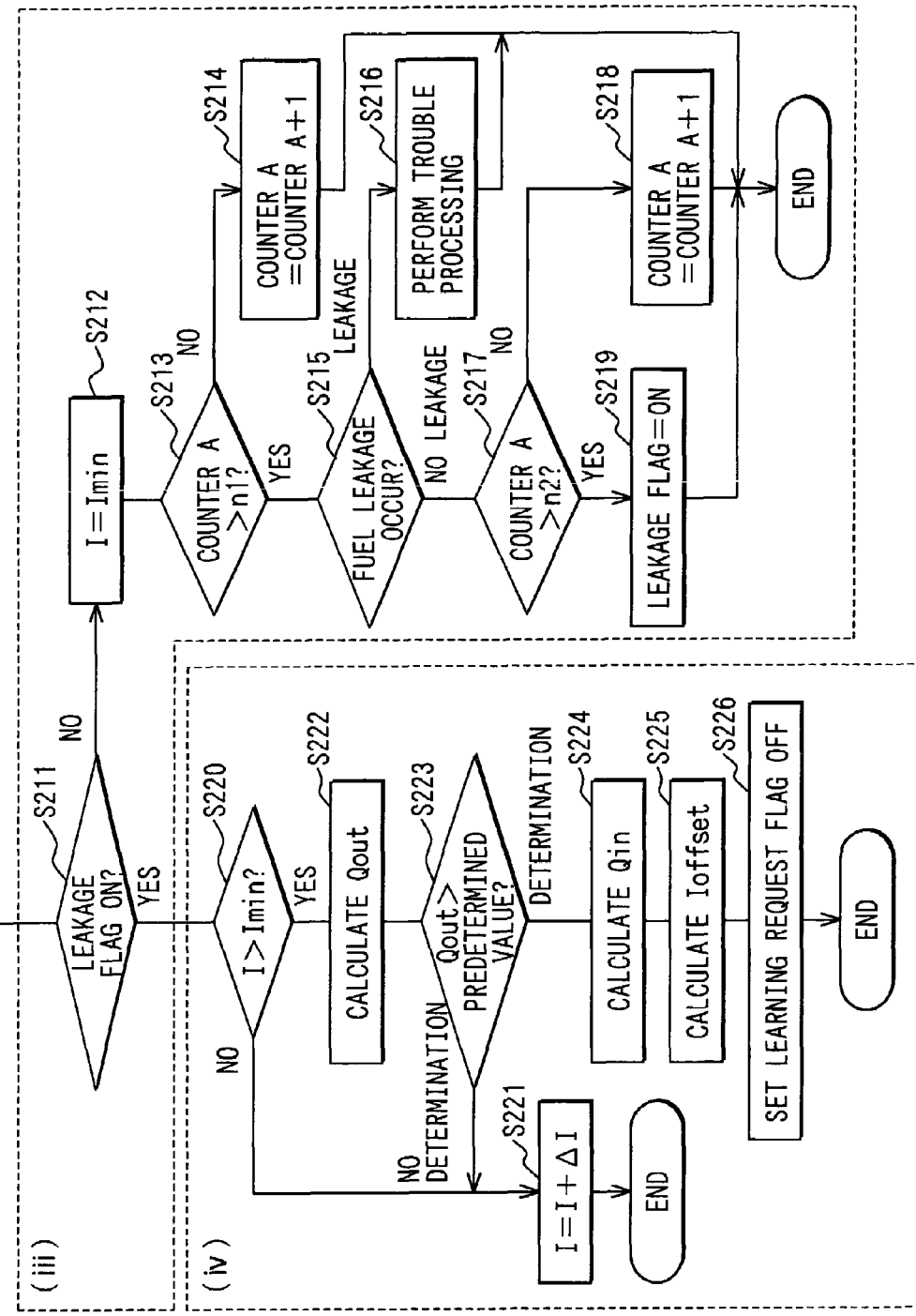

FIGS. 20 and 21, which illustrate a seventh embodiment of the present invention, are flowcharts showing the details of the pump machine difference learning control.

In the supply pump 4 having the suction metering valve 5 of a normally closed type in which the amount of fuel to be sucked into the first and second plunger chambers 51, 52 is changed in accordance with the drive current value for the solenoid coil 26, the metering characteristic (pump suction quantity=pump discharge quantity characteristic relative to the drive current value, i.e., such a characteristic as the larger the drive current value, the larger the pump suction quantity) of the suction metering valve 5 is influenced by a machine difference of each pump (a mechanical individual difference of the supply pump 4), a temperature change, a physical change, or other variations. For example, when there are variations in the biasing force of the coiled spring 27 which bias the valve element 25 of the suction metering valve 5 in the closing direction, such variations exert an influence on the drive current value at which the valve element 25 starts lifting and also on the subsequent lift quantity. Likewise, variations in the shape of opening which occur during fabrication cause a change in the valve lift quantity relative to the opening area, with consequent discrepancy in the suction starting current value.

In this embodiment, in view of the above-mentioned problems, variations caused by the influence of a pump machine difference or a temperature change or a physical change on the metering characteristic of the suction metering valve 5 are learned and corrected to diminish variations in the actual pump suction quantity (=pump discharge quantity) relative to the command suction quantity (=pump command discharge quantity: control command value), thereby improving the controllability for the fuel pressure within the common rail 1 or within the high-pressure fuel pipes 6 and 7, i.e., the common rail pressure. To this end, the processing of the flowcharts of FIGS. 20 and 21 showing the details of the pump machine difference learning control is executed. The subroutine of FIGS. 20 and 21 is started at every pressure-supply cycle of the supply pump 4 after turning ON (IG, ON) the ignition switch and is executed before the pump control (normal pressure FB control, fuel pressure control) of Step S59 in the subroutine of FIG. 9.

First, it is determined whether a pump control defect (FAIL2) such as pump pressure supply shortage (HU-SOKU2) caused by the incorporation of a large amount of air into the cylinder(s) of one or more pressure-supply systems in the supply pump 4 before a complete shortage of fuel or caused by a slide defect of the slide portion or pump pressure-supply surplus (KAJO2) caused by an operation defect of the movable portion is occurring or not. That is, it is determined whether at least one of KAJO2 (surplus counter) in the subroutine of FIG. 7, HUSOKU2 (shortage counter) in the subroutine of FIG. 7, and the Control Defect Flag (PFAIL2) in the subroutine of FIG. 15, is set to one or not (Step S201). When the answer in Step S201 is affirmative, a Learning Request Flag is set to OFF (Step S202). Thereafter, the processing flow advances to the determination processing of Step S204.

When the answer in Step S201 is negative, a Learning Request Flag is set to ON (Step S203). Thereafter, the processing flow advances to the determination processing of Step S204.

The subroutine of FIGS. 20 and 21 divided into four blocks (i)–(iv) will now be described:

(i) First, it is determined whether the Learning Request Flat is ON or not. The Learning Request Flag serves as a reference for determining whether a pump machine difference learning correction (learning correction of the suction starting current value (Ioffset) in the suction metering valve 5) is necessary or not (Step S204). When the answer in Step S204 is negative, the processing flow advances to a determination processing of Step S207.

On the other hand, when the answer in Step S204 is affirmative, it is determined whether the engine is starting or idling (idling stable state) (Step S205). When the answer in Step S205 is idling, Counter A for determining whether a stable condition exists or not is set to zero and a Leakage Detection Flag for detecting the leakage of fuel is set to OFF (Step S206). Next, the pump machine difference learning correction is determined to be unnecessary and the ordinary common rail pressure feedback control is performed (Step S207). Thereafter, the processing flow leaves the subroutine of FIG. 20.

Thus, the pump machine difference learning correction (learning correction of the suction starting current value (Ioffset) in the suction metering valve 5) is performed by utilizing a period in which the fuel pressure-supply quantity is relatively small such as when the engine is starting or idling during a stop of the vehicle. Particularly, at the time of start-up of the engine, when there occurs a state incapable of pressure-supplying the fuel due to variations in the fuel pressure-supply quantity, it is likely that the engine will stall. Therefore, it is effective to perform the pump machine difference learning correction at the time of start-up of the engine. On the other hand, during stop of the vehicle, the pump machine difference learning correction may be done in the case where the learning at the time of start-up of the engine was insufficient or where it has become impossible to utilize the learning value by some influence. Initial values of the Learning Request Flag, Counter A, and the Leak Detection Flag are set to ON, 0, and OFF, respectively.

(ii) When the answer in Step S205 is affirmative, until the suction starting current value (Ioffset) for the suction metering valve 5 is calculated, the same value is driven at a drive current value (Imax). This ensures a minimum suction quantity or a drive current value (Imin), which in turn ensures a suction quantity of zero to maintain the common rail pressure within a predetermined range between upper- and lower-limit values. First, the common rail pressure (NPC) detected by the fuel pressure sensor 75 is compared with upper- and lower-limit values thereof. When the fuel pressure is above the upper-limit value, a Step-up Flag and Counter A are set to OFF and 0, respectively. When the fuel pressure is below the lower-limit value, the Step-up Flag is set to ON (Step S208). When the fuel pressure lies between the lower- and upper-limit values, the Step-up Flag and Counter A are left as they are.

Next, it is determined whether Step-up Flag is OFF or not (Step S209). When the answer in Step S209 is negative, the drive current value (I) is set to (Imax) (Step S210). Thereafter, the subroutine of FIG. 20 is once ended. The drive current value (Imax) is a current value at which a required minimum suction quantity is ensured when the relation between the drive current value and the pump suction quantity has variations. The drive current value (Imax) is set either equal to or larger than a maximum current value, which is presumed under variations among current values affording the minimum suction quantity.

(iii) When the answer in Step S209 is affirmative, it is determined whether the Leakage Detection Flag is ON or not (Step S211). When the answer in Step S211 is negative, it is assumed that a determination to the effect of there being no fuel leakage has been made and the drive current value (I) is set to (Imin) (Step S212). The drive current value (Imin) is a drive current value at which a zero suction quantity is ensured when the relation between the drive current value and the pump suction quantity has variations. The drive current value (Imin) is set either equal to or smaller than a minimum current value, which is presumed under variations.

Next, it is determined whether the count value of Counter A is larger than n1 or not (Step S213). More specifically, just after changing the Step-up Flag from ON to OFF and the drive current value (I) from Imax to Imin, it is likely that the fuel sucked into the supply pump 4 will be supplied under pressure, resulting in the common rail pressure being varied. For this reason, n1 is set to a number at which the pump pressure-supply quantity becomes zero, e.g., n1=2. When the answer in Step S213 is negative, Counter A is replaced by Counter A+1 (Step S214). Thereafter, the subroutine of FIG. 21 is once ended.

When the answer in Step S213 is affirmative, it is determined whether fuel leakage is occurring or not (Step S215). Arithmetic expressions (4) and (5) for detecting fuel leakage are shown below. In those arithmetic expressions, fuel injection quantity and predicted leakage quantity are assumed to be quantities in a fuel pressure sampling period. Predicted fuel discharge quantity indicates a total outflow quantity of fuel flowing out from the plurality of injectors 2. More particularly, the predicted fuel discharge quantity indicates a total outflow quantity of fuel in 360° CA period. As the predicted fuel discharge quantity, the total of fuel injection quantity (QINJ) in a predetermined crank angle (e.g., 360° CA) period, the total of injector clearance leakage quantity (injector static leakage quantity: QSL) in a predetermined crank angle (e.g., 360° CA) period, and the total of injector switching leakage quantity (injector dynamic leakage quantity: QDL) in a predetermined crank angle period (e.g., 360° CA) period were added.

Predicted fuel discharge quantity=Fuel injection quantity+Predicted leakage quantity (4)

Fuel leakage quantity=−Fuel pressure change quantity×Volume of the high-pressure portion/ Bulk modulus−Predicted fuel discharge quantity (5)

That is, the difference between the fuel quantity corresponding to the actual pressure drop and the predicted fuel discharge quantity is assumed to be the fuel leakage quantity and when the fuel leakage quantity is larger than a predetermined decision value, it is determined that fuel leakage is occurring. In this case, it is determined that a certain trouble has occurred, and a trouble processing is performed (Step S216). Thereafter, the processing flow leaves the routine of FIG. 21.

When fuel leakage is below the decision value and it is determined that there is no fuel leakage in Step S215, it is determined whether the count value of Counter A is larger than n2 or not (Step S217). The value n2 is a value for repeating the fuel leakage determination of Step S215 by a predetermined number of times and determining that there is no fuel leakage. For example, when n1=2 and n2=5, the fuel leakage determination is repeated three times. When the answer in Step S217 is negative, Counter A is replaced by Counter A+1 (Step S218). Thereafter, the processing flow leaves the subroutine of FIG. 21.

When the answer in Step S217 is affirmative, the Leakage Detection Flat is set to ON (Step S219). Thereafter, the processing flow leaves the subroutine of FIG. 21.

(iv) When the answer in Step S211 is affirmative, it is determined whether the drive current value (I) is larger than Imin or not (Step S220). When the answer in Step S220 is negative, the drive current value (I) is replaced by I+ΔI (Step S221). Thereafter, the processing flow leaves the subroutine of FIG. 21.

When the answer in Step S220 is affirmative, a pump pressure-supply quantity (Qout) is calculated in accordance with the following arithmetic expression (6) at Step S222. In the following arithmetic expression (6), a predicted fuel discharge quantity has the same meaning as in the foregoing arithmetic expression (4).

Pump pressure-supply quantity=Fuel pressure change quantity×Volume of the high-pressure portion/ Bulk modulus+Predicted fuel discharge quantity (6)

Next, suction start determination is performed and it is determined whether the calculated pump pressure-supply quantity (Qout) is larger than a predetermined decision value or not (Step S223). A very small value is set as this decision value and when the calculated pump pressure-supply quantity (Qout) is larger than the decision value, it is determined that the pressure-supply of fuel, i.e., suction, has been performed and the start of suction is determined. When in Step S223 the pump pressure-supply quantity (Qout) is below the decision value and the start of suction cannot be determined, the processing flow advances to Step S221, in which the drive current value (I) is replaced by I+ΔI.

When in Step S223 the pump pressure-supply quantity (Qout) is larger than the decision value and the start of suction could be determined, a pump suction quantity (Qin) is calculated (Step S224). More specifically, the pump suction quantity (Qin) is calculated from the following expression (7) which is a relationship between known pump suction quantity and pump pressure-supply quantity and using the pump pressure-supply quantity (Qout) calculated in Step S222.

Pump suction quantity=$f$(Qout, NPC) (7)

Next, a suction start current value (Ioffset) for the suction metering valve 5 is calculated from the pump suction quantity (Qin) calculated in Step S224 and in accordance with the following arithmetic expression (8) (Step S225).

Suction start current value=$I-f$(Qin, NE)×α (8)

wherein I stands for a drive current value at the time when the start of suction is determined and the correction coefficient α is a constant.

Next, the Learning Request Flag is turned OFF (Step S226). Thereafter, the processing flow leaves the subroutine of FIG. 21. The suction start current value (Ioffset) thus calculated is stored as the this-time learning value and the metering characteristic (pump suction quantity (=pump discharge quantity) characteristic relative to the drive current value) of the suction metering valve 5 is corrected based on the suction start current value. With this, variations in the actual pump suction quantity (=pump discharge quantity) relative to the command suction quantity (=pump command discharge quantity:control command value) are diminished. Consequently, the common rail pressure controllability at the time of converging the common rail pressure (NPC) to the target fuel pressure (PFIN) can be greatly improved. Furthermore, the above pump machine difference learning correction may be made feasible at a constant or variable learning correction frequency (e.g., mileage).

In the common rail type fuel injection system of this embodiment, as described above, when it is determined that a pump control defect (FAIL2) such as pump pressure-supply shortage (HUSOKU2) caused, for example, by the incorporation of a large amount of air into the cylinder(s) of one or more pressure-supply systems in the supply pump 4 before a complete shortage of fuel is occurring, the learning control of learning and correcting a pump machine difference (a mechanical individual difference of the supply pump 4) or a temperature change or a physical change is stopped or inhibited. With this, it is possible to prevent an erroneous learning of such pump machine difference or temperature difference or physical change. Accordingly, when the learning and correction of such pump machine difference or temperature change or physical change is continued at the time of detecting a pump control defect (FAIL2) such as pump pressure-supply shortage (HUSOKU2) caused for example by the incorporation of a large amount of air into the cylinder(s) of one or more pressure-supply systems in the supply pump 4, it is possible to eliminate the inconvenience of acquiring an erroneous learning value and hence possible to prevent deterioration of the common rail pressure controllability.

Although in this embodiment there is performed the pump machine difference learning control for learning and correcting variations in actual pump suction quantity relative to the pump command suction quantity (control command value) which are caused by a pump machine difference or a temperature change or a physical change, there may be conducted a learning control for learning and correcting variations in actual pump discharge quantity relative to the pump command discharge quantity (control command value). Alternatively, there may be conducted a learning control for learning and correcting variations in actual pump suction quantity or pump discharge quantity relative to the drive current value applied to the solenoid coil 26 of the suction metering valve 5 which are caused by a pump machine difference or a temperature change or a physical change.

In this embodiment a description has been given about learning and correcting variations in actual pump suction quantity relative to the pump command suction quantity (control command value) in the case of the suction metering valve 5 of a normally closed type in which the valve 25 closes when the pump drive current (SCV drive current) is not applied to the solenoid coil 26. However, the present invention is also applicable to learning and correcting variations in actual pump suction quantity relative to the pump command suction quantity (control command value) in a suction metering valve 5 of a normally open type in which the valve 25 closes when the pump drive current (SCV drive current) is applied to the solenoid coil 26. In this case, the relation between the drive current value and the pump suction quantity (=pump discharge quantity) becomes reverse to that in the above-described embodiment. That is, the larger the drive current value, the smaller the pump suction quantity (=pump discharge quantity).

In the above embodiments the present invention is applied to the fuel injection system (pump troubleshooting system) of an internal combustion engine. It is determined whether a pump failure such as a pump pressure-supply shortage failure or a pump pressure-supply surplus failure is occurring or not and whether a pump control defect such as pump pressure-supply shortage caused for example by the incorporation of a large amount of air into the cylinder(s) of one or more pressure-supply systems is occurring or not, in one or more pressure-supply systems out of a plurality of pressure-supply systems in the supply pump 4. The supply pump 4 is of the type which meters the amount of fuel to be sucked into the plurality of pressure-supply systems by adjusting the area of opening with use of a single electromagnetic valve such as the suction metering valve 5. However, the present invention may be applied to a pump troubleshooting system in which it is determined whether a pump failure such as a pump pressure-supply shortage failure or a pump pressure-supply surplus failure is occurring or not and whether a pump control defect such as pump pressure-supply shortage caused for example by the incorporation of a large amount of air into the cylinder(s) of one or more pressure-supply systems is occurring or not, in one or more pressure-supply systems out of the plurality of pressure-supply systems in a supply pump which is provided with an electromagnetic valve for each of the pressure-supply systems.

In the above embodiments the present invention is applied to the pump troubleshooting system in which it is determined whether a pump failure such as a pump pressure-supply shortage failure or a pump pressure-supply surplus failure is occurring or not and whether a pump control defect such as pump pressure-supply shortage caused for example by the incorporation of a large amount of air into the cylinder(s) of one or more pressure-supply systems is occurring or not, in at least one of two pressure-supply systems in the supply pump 4 having the two pressure-supply systems. However, the present invention may be applied to a pump troubleshooting system in which it is determined whether a pump failure such as a pump pressure-supply shortage failure or a pump pressure-supply surplus failure is occurring or not and whether a pump control defect such as pump pressure-supply shortage caused, for example, by the incorporation of a large amount of air into the cylinder(s) of one more pressure-supply systems is occurring or not, in one or more pressure-supply systems out of three or more pressure-supply systems in a supply pump 4 having the three or more pressure-supply systems.

Although in the above embodiments the present invention is applied to the pump troubleshooting system for the supply pump 4 used in the common rail type fuel injection system, the present invention may be applied to a pump troubleshooting system not for the supply pump 4 for an accumulator type fuel injection system but for a distributor type or in-line type fuel injection pump used in a common rail-free fuel injection system for an internal combustion engine. The number of pump elements is not especially limited. It may be one or three or more. The number of suction valves is not especially limited, either. It may also be one or three or more.

In the above embodiments EEPROM is used as an integral storage means for updatedly storing an integral term, which is for calculating a feedback correction quantity and also as a learning value storage means for updately storing a learning value corresponding to variations in actual pump suction or discharge quantity relative to a control command value, which variations are caused by a pump machine difference or a physical change. However, the EEPROM may be substituted by such a non-volatile memory as Stand-by RAM, EPROM, or flash memory, or another storage medium such as DVD-ROM, CD-ROM, or flexible disk. Also in this case, the stored contents are preserved even after turning OFF (IG, OFF) the ignition switch or after pulling out the engine key from the key cylinder.

When the feedback correction quantity calculated in feedback control is above a predetermined value or when the difference between the last-time and this-time integral terms is outside a predetermined range, the presence of larger variations in pump discharge quantity than a predetermined value relative to the basic discharge quantity (reference control quantity: FBB) of the supply pump 4 can be detected. In this case, or upon detection of a pump failure such as a pump pressure-supply shortage failure or a pump pressure-supply surplus failure, a trouble warning lamp (indicator lamp) may be turned ON to urge the driver to replace the supply pump 4 or the suction metering valve 5.

In the above embodiments the present invention is applied to the fuel pressure control method wherein the drive current value (pump suction quantity=pump pressure–supply quantity or the lift quantity or valve position of the valve 25) to be applied to the solenoid coil 26 of the suction metering valve 5 in the supply pump 4 is feedback-controlled by PI (proportional integral) control However, it should be appreciated that the present invention may be applied to a fuel pressure control method wherein the drive current value (pump suction quantity=pump pressure-supply quantity or the lift quantity or valve position of the valve 25) to be applied to the solenoid coil 26 of the suction metering valve 5 in the supply pump 4 is feedback-controlled by a PID (proportional integro-differential) control.

What is claimed is:

1. A fuel injection system for an internal combustion engine, comprising:
   A a fuel supply pump for supplying fuel under pressure to a fuel injection valve in the internal combustion engine;
   B a fuel pressure detector for detecting the pressure of the fuel supplied under pressure from the fuel supply pump to the fuel injection valve; and
   C a fuel pressure control unit for controlling the amount of the fuel supplied under pressure from the fuel supply pump based on a deviation between an actual fuel pressure detected by the fuel pressure detector and a target fuel pressure which is set in accordance with an operating condition of the internal combustion engine, wherein the fuel pressure control unit comprises:
   an integral term calculator for adding an integral compensation quantity and a last-time integral term to calculate a this-time integral term, the integral compensation quantity being updated in accordance with the deviation between the actual fuel pressure and the target fuel pressure; and an integral term holder that stops updating of the integral compensation quantity and retains the last-time integral term when a pressure-supply defect of the fuel supply pump is detected, and wherein the time when a pressure-supply defect of the fuel supply pump is detected indicates any of the period in which a failure or a control defect of the fuel supply pump is detected, the period until the lapse of a predetermined time after a failure or a control defect of the fuel supply pump is no longer detected from the time when the failure or the control defect has been detected, and the period until the operation of the internal combustion engine is stopped from the time when a failure or a control defect of the fuel supply pump has been detected.

2. The fuel injection system according to claim 1, wherein the fuel pressure control unit comprises:

a fuel pressure determiner for calculating a target fuel pressure in accordance with an operating condition of the internal combustion engine;

a proportional term calculator for calculating a this-time proportional term in accordance with a deviation between the actual fuel pressure and the target fuel pressure; and a feedback correction quantity calculator for calculating a feedback correction quantity based on the this-time integral term and the this-time proportional term.

3. A fuel injection system for an internal combustion engine, comprising:

A a fuel supply pump for supplying fuel under pressure to a fuel injection valve in the internal combustion engine;

B a fuel pressure detector for detecting the pressure of the fuel supplied under pressure from the fuel supply pump to the fuel injection valve; and C a fuel pressure control unit for controlling the amount of the fuel supplied under pressure from the fuel supply pump based on a deviation between an actual fuel pressure detected by the fuel pressure detector and a target fuel pressure which is set in accordance with an operating condition of the internal combustion engine, wherein the fuel pressure control unit comprises:

an integral term calculator for adding an integral compensation quantity and a last-time integral term to calculate a this-time integral term, the integral compensation quantity being updated in accordance with the deviation between the actual fuel pressure and the target fuel pressure; and an integral term clearer that eliminates the integral compensation quantity and the last-time integral term and calculates a this-time integral term when a pressure-supply defect of the fuel supply pump is detected, wherein the time when a pressure-supply defect of the fuel supply pump is detected indicates any of the period in which a failure or a control defect of the fuel supply pump is detected, the period until the lapse of a predetermined time after a failure or a control defect of the fuel supply pump is no longer detected from the time when the failure or the control defect has been detected, and the period until the operation of the internal combustion engine is stopped from the time when a failure or a control defect of the fuel supply pump has been detected.

4. The fuel injection system according to claim 3, wherein the fuel pressure control unit comprises:

an injection quantity determiner for calculating a target injection quantity in accordance with an operating condition of the internal combustion engine;

a fuel pressure determiner for calculating a target fuel pressure in accordance with an operating condition of the internal combustion engine;

a reference control quantity determiner for calculating a reference control quantity for the fuel supply pump based on the target injection quantity set by the injection quantity determiner and the target fuel pressure set by the fuel pressure determiner;

a proportional term calculator for calculating a this-time proportional term in accordance with a deviation between the actual fuel pressure and the target fuel pressure; and a feedback correction quantity calculator for calculating a feedback correction quantity relative to the reference control quantity based on the this-time integral term and the this-time proportional term.

5. A fuel injection system for an internal combustion engine, comprising:

A a fuel supply pump for supplying fuel under pressure to a fuel injection valve in the internal combustion engine;

B a fuel pressure detector for detecting the pressure of the fuel supplied under pressure from the fuel supply pump to the fuel injection valve; and C a fuel pressure control unit for calculating a control command value for the fuel supply pump in accordance with an operating condition of the internal combustion engine and applying the control command value to the fuel supply pump to control the amount of the fuel to be supplied under pressure from the fuel supply pump, the fuel pressure control unit comprising:

a learning control executioner for making a learning control to learn variations in the amount of fuel supplied under pressure relative to the control command value for the fuel supply pump which variations correspond to a mechanical individual difference or a physical change of the fuel supply pump; and a learning control stopper that stops or inhibits the learning control when a pressure-supply defect of the fuel supply pump is detected, wherein the time when a pressure-supply defect of the fuel supply pump is detected indicates any of the period in which a failure or a control defect of the fuel supply pump is detected, the period until the lapse of a predetermined time after a failure or a control defect of the fuel supply pump is no longer detected from the time when the failure or the control defect has been detected, and the period until the operation of the internal combustion engine is stopped from the time when a failure or a control defect of the fuel supply pump has been detected.

6. The fuel injection system according to claim 5, wherein the fuel supply pump is a suction metering type fuel supply pump provided with a suction metering valve for changing the amount of the fuel to be introduced into a pressure chamber in accordance with a drive current value, the suction metering type fuel supply pump pressurizing the fuel to a high-pressure level, which fuel is introduced into the pressure chamber through the suction metering valve, and supplying the high-pressure fuel to the fuel injection valve, and the learning control executioner makes a learning control to learn variations in an actual pump suction quantity or pump discharge quantity relative to a pump command suction quantity or pump command discharge quantity.

7. The fuel injection system according to claim 5,
wherein the fuel injection valve is mounted correspondingly to each of cylinders of the internal combustion engine,
the fuel supply pump is a high-pressure supply pump having a plurality of pressure-supply systems, the pressure-supply systems being connected respectively to the fuel injection valves through a fuel pipe to supply the fuel under a high-pressure toward the interior of the fuel pipe, and
a common rail for temporarily storing the high-pressure fuel discharged from the plurality of pressure-supply systems of the high-pressure supply pump is connected to a certain position of the fuel pipe.

8. The fuel injection system according to claim 7, wherein the fuel pressure control unit comprises:
a pressure-supply quantity estimator for estimating the amount of the fuel supplied under pressure for each of the plurality of pressure-supply systems;
a failure detector that compares the estimated amount of the fuel supplied for each of the plurality of pressure-supply systems after the estimation by the pressure-supply quantity estimator, with a first decision value and a second decision value smaller than the first decision value and, when the amount of the fuel supplied under pressure is larger or smaller than the first decision value in only a specific one of the pressure-supply systems, detects a failure of the specific pressure-supply system; and
a control defect detector that detects a control defect of the specific pressure-supply system when the amount of the fuel supplied under pressure is larger or smaller than the second decision value in only a specific one of the pressure-supply systems.

9. The fuel injection system according to claim 8, wherein, the failure detector defines a state as a complete shortage of fuel and excludes the state from detection when the amount of the fuel supplied under pressure is smaller than the first or the second decision value in all of the pressure-supply systems, and
the failure detector detects a surplus pressure-supply with respect to all of the pressure-supply systems when the amount of the fuel supplied under pressure is larger than the first decision value in all of the pressure-supply systems.

10. The fuel injection system according to claim 7, wherein the fuel pressure control unit comprises:
a pressure-supply quantity estimator for estimating the amount of the fuel supplied under pressure for each of the plurality of pressure-supply systems;
a pressure-supply quantity difference detector for detecting a difference between a last-time pressure-supply quantity and a this-time pressure-supply quantity with respect to the estimated amount of the fuel supplied under pressure for each of the plurality of pressure-supply systems after the estimation by the pressure-supply quantity estimator;
a pump failure detector that compares the difference between the last-time pressure-supply quantity and the this-time pressure-supply quantity for each of the plurality of pressure-supply systems after the calculation by the pressure-supply quantity difference detector with a first decision value and a second decision value smaller than the first decision value and
detects a failure of the pressure-supply system concerned when the difference between the last-time pressure-supply quantity and the this-time pressure-supply quantity for each of the plurality of pressure-supply systems is larger or smaller than the first decision value; and
a control defect detector that detects a control defect of the pressure-supply system concerned when the difference between the last-time pressure-supply quantity and the this-time pressure-supply quantity for each of the plurality of pressure-supply systems is larger or smaller than the second decision value.

11. The fuel injection system according to claim 8, wherein one of the first and the second decision value is set based on a fuel pressure-supply quantity or a fuel discharge quantity or a fuel discharge pressure for each of the plurality of pressure-supply systems in the case where all the pressure-supply systems in the high-pressure supply pump are normal.

12. The fuel injection system according to claim 8,
wherein the first or the second decision value is set based on at least one of an engine speed, a fuel injection quantity, and a fuel injection pressure.

13. The fuel injection system according to claim 1,
wherein the fuel injection valve is mounted correspondingly to each of cylinders of the internal combustion engine,
the fuel supply pump is a high-pressure supply pump having a plurality of pressure-supply systems, the pressure-supply systems being connected respectively to the fuel injection valves through a fuel pipe to supply the fuel under a high-pressure toward the interior of the fuel pipe, and
a common rail for temporarily storing the high-pressure fuel discharged from the plurality of pressure-supply systems of the high-pressure supply pump is connected to a certain position of the fuel pipe.

14. The fuel injection system according to claim 13, wherein the fuel pressure control unit comprises:
a pressure-supply quantity estimator for estimating the amount of the fuel supplied under pressure for each of the plurality of pressure-supply systems;
a failure detector that compares the estimated amount of the fuel supplied for each of the plurality of pressure-supply systems after the estimation by the pressure-supply quantity estimator, with a first decision value and a second decision value smaller than the first decision value and, when the amount of the fuel supplied under pressure is larger or smaller than the first decision value in only a specific one of the pressure-supply systems, detects a failure of the specific pressure-supply system; and
a control defect detector that detects a control defect of the specific pressure-supply system when the amount of the fuel supplied under pressure is larger or smaller than the second decision value in only a specific one of the pressure-supply systems.

15. The fuel injection system according to claim 14, wherein, the failure detector defines a state as a complete shortage of fuel and excludes the state from detection when the amount of the fuel supplied under pressure is smaller than the first or the second decision value in all of the pressure-supply systems, and
the failure detector detects a surplus pressure-supply with respect to all of the pressure-supply systems when the amount of the fuel supplied under pressure is larger than the first decision value in all of the pressure-supply systems.

16. The fuel injection system according to claim 13, wherein the fuel pressure control unit comprises:
a pressure-supply quantity estimator for estimating the amount of the fuel supplied under pressure for each of the plurality of pressure-supply systems;
a pressure-supply quantity difference detector for detecting a difference between a last-time pressure-supply quantity and a this-time pressure-supply quantity with respect to the estimated amount of the fuel supplied under pressure for each of the plurality of pressure-supply systems after the estimation by the pressure-supply quantity estimator;
a pump failure detector that compares the difference between the last-time pressure-supply quantity and the this-time pressure-supply quantity for each of the plurality of pressure-supply systems after the calculation by the pressure-supply quantity difference detector with a first decision value and a second decision value smaller than the first decision value and
detects a failure of the pressure-supply system concerned when the difference between the last-time pressure-supply quantity and the this-time pressure-supply quantity for each of the plurality of pressure-supply systems is larger or smaller than the first decision value; and
a control defect detector that detects a control defect of the pressure-supply system concerned when the difference between the last-time pressure-supply quantity and the this-time pressure-supply quantity for each of the plurality of pressure-supply systems is larger or smaller than the second decision value.

17. The fuel injection system according to claim 14, wherein one of the first and the second decision value is set based on a fuel pressure-supply quantity or a fuel discharge quantity or a fuel discharge quantity or a fuel discharge pressure for each of the plurality of pressure-supply systems in the case where all the pressure-supply systems in the high-pressure supply pump are normal.

18. The fuel injection system according to claim 14, wherein the first or the second decision value is set based on at least one of an engine speed, a fuel injection quantity, and a fuel injection pressure.

19. The fuel injection system according to claim 3, wherein the fuel injection valve is mounted correspondingly to each of cylinders of the internal combustion engine,
the fuel supply pump is a high-pressure supply pump having a plurality of pressure-supply systems, the pressure-supply systems being connected respectively to the fuel injection valves through a fuel pipe to supply the fuel under a high-pressure toward the interior of the fuel pipe, and
a common rail for temporarily storing the high-pressure fuel discharged from the plurality of pressure-supply systems of the high-pressure supply pump is connected to a certain position of the fuel pipe.

20. The fuel injection system according to claim 19, wherein the fuel pressure control unit comprises:
a pressure-supply quantity estimator for estimating the amount of the fuel supplied under pressure for each of the plurality of pressure-supply systems;
a failure detector that compares the estimated amount of the fuel supplied for each of the plurality of pressure-supply systems after the estimation by the pressure-supply quantity estimator, with a first decision value and a second decision value smaller than the first decision value and, when the amount of the fuel supplied under pressure is larger or smaller than the first decision value in only a specific one of the pressure-supply systems, detects a failure of the specific pressure-supply system; and
a control defect detector that detects a control defect of the specific pressure-supply system when the amount of the fuel supplied under pressure is larger or smaller than the second decision value in only a specific one of the pressure-supply systems.

21. The fuel injection system according to claim 20, wherein, the failure detector defines a state as a complete shortage of fuel and excludes the state from detection when the amount of the fuel supplied under pressure is smaller than the first or the second decision value in all of the pressure-supply systems, and
the failure detector detects a surplus pressure-supply with respect to all of the pressure-supply systems when the amount of the fuel supplied under pressure is larger than the first decision value in all of the pressure-supply systems.

22. The fuel injection system according to claim 19, wherein the fuel pressure control unit comprises:
a pressure-supply quantity estimator for estimating the amount of the fuel supplied under pressure for each of the plurality of pressure-supply systems;
a pressure-supply quantity difference detector for detecting a difference between a last-time pressure-supply quantity and a this-time pressure-supply quantity with respect to the estimated amount of the fuel supplied under pressure for each of the plurality of pressure-supply systems after the estimation by the pressure-supply quantity estimator;
a pump failure detector that compares the difference between the last-time pressure-supply quantity and the this-time pressure-supply quantity for each of the plurality of pressure-supply systems after the calculation by the pressure-supply quantity difference detector with a first decision value and a second decision value smaller than the first decision value and
detects a failure of the pressure-supply system concerned when the difference between the last-time pressure-supply quantity and the this-time pressure-supply quantity for each of the plurality of pressure-supply systems is larger or smaller than the first decision value; and
a control defect detector that detects a control defect of the pressure-supply system concerned when the difference between the last-time pressure-supply quantity and the this-time pressure-supply quantity for each of the plurality of pressure-supply systems is larger or smaller than the second decision value.

23. The fuel injection system according to claim 20, wherein one of the first and the second decision value is set based on a fuel pressure-supply quantity or a fuel discharge quantity or a fuel discharge pressure for each of the plurality of pressure-supply systems in the case where all the pressure-supply systems in the high-pressure supply pump are normal.

24. The fuel injection system according to claim 20, wherein the first or the second decision value is set based on at least one of an engine speed, a fuel injection quantity, and a fuel injection pressure.

* * * * *